US012499292B1

(12) United States Patent
Semple et al.

(10) Patent No.: US 12,499,292 B1
(45) Date of Patent: Dec. 16, 2025

(54) PARAMETERIZED OBJECT CONTROLLERS IN DRIVING SIMULATIONS

(71) Applicant: Zoox, Inc., Foster City, CA (US)

(72) Inventors: Tod Cameron Semple, Woodside, CA (US); Nathan David Shemonski, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 1093 days.

(21) Appl. No.: 17/411,760

(22) Filed: Aug. 25, 2021

(51) Int. Cl.
*G06F 30/20* (2020.01)
*B60W 40/09* (2012.01)
*B60W 60/00* (2020.01)
*G06F 18/21* (2023.01)

(52) U.S. Cl.
CPC ............ *G06F 30/20* (2020.01); *B60W 40/09* (2013.01); *B60W 60/001* (2020.02); *G06F 18/2185* (2023.01); *B60W 2540/30* (2013.01); *B60W 2554/40* (2020.02)

(58) Field of Classification Search
CPC ............ B60W 60/001; B60W 40/09; B60W 2554/40; B60W 2540/30; G06F 18/2185; G06F 30/20
USPC .......................................................... 703/8
See application file for complete search history.

(56) References Cited

U.S. PATENT DOCUMENTS

| | | | | |
|---|---|---|---|---|
| 2020/0034514 A1* | 1/2020 | Anderson | ............ | G06F 30/17 |
| 2020/0134494 A1* | 4/2020 | Venkatadri | ............ | G06N 3/045 |
| 2021/0046923 A1* | 2/2021 | Olson | ................. | B60W 30/095 |
| 2021/0166474 A1* | 6/2021 | Behar | .................... | G06T 19/20 |
| 2021/0390225 A1* | 12/2021 | Yu | ............................ | G06F 30/15 |

FOREIGN PATENT DOCUMENTS

WO  WO-2017079229 A1 *  5/2017  ............ B60W 40/02

OTHER PUBLICATIONS

Joseph K. Kearney, "Handbook of Driving Simulation for Engineering, Medicine, and Psychology: Section 6—Scenario Authoring" Taylor & Francis Group (Year: 2011).*
Chris W. Schwarz, "Handbook of Driving Simulation for Engineering, Medicine, and Psychology: Section 11—Validating Vehicle Models" Taylor & Francis Group (Year: 2011).*
Perroud, Benoit, et al. "Model of realism score for immersive VR systems." Transportation research part F: Traffic psychology and behaviour 61 (2019): 238-251. (Year: 2019).*

* cited by examiner

*Primary Examiner* — John E Johansen
(74) *Attorney, Agent, or Firm* — Lee & Hayes, P.C.

(57) ABSTRACT

Techniques are discussed herein for executing simulations with parameterized object controllers to control smart agents, to evaluate the agent realism of the smart agents and to validate the efficacy of the simulations. A simulation system may analyze log data captured by a vehicle operating in a physical environment, to determine observable and non-observable behavior characteristics of the agents in the environment. The simulation system may execute simulations using object controllers to control simulated objects (e.g., "smart agents") based on parameters associated with scenarios, object types, and/or scenario locations. Log data associated with smart agent behaviors may be aggregated and compared to the behavior characteristics of agents in physical environments, to determine metrics for agent realism and simulation efficacy. Based on such metrics, simulation results may be validated and/or object controller parameters may be modified.

19 Claims, 8 Drawing Sheets

PARAMETERIZED OBJECT CONTROLLERS IN DRIVING SIMULATIONS

BACKGROUND

Vehicles are increasingly supplementing or replacing manual functionality with automatic controls. Autonomous driving may benefit from computing systems capable of making split-second decisions to respond to myriad events and scenarios, including vehicle reactions to dynamic objects operating in an environment of the vehicle. Simulations can be used to test and validate the features and functionalities of vehicle control systems, including those that may be otherwise prohibitive to test in real world environments for example, due to safety concerns, limitations on time, repeatability, etc. For example, autonomous vehicles may use driving simulations to test and improve the performance of the vehicle control systems with respect to passenger safety, vehicle decision-making, sensor data analysis, route optimization, and the like. However, driving simulations that accurately reflect real world scenarios may be difficult and expensive to create and execute, as the data used to create such simulations may be noisy, inconsistent, or incomplete. Additionally, execution of driving simulations may involve executing multiple different interacting systems and components, including the vehicle control systems being evaluated, as well as agents and other objects in the simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
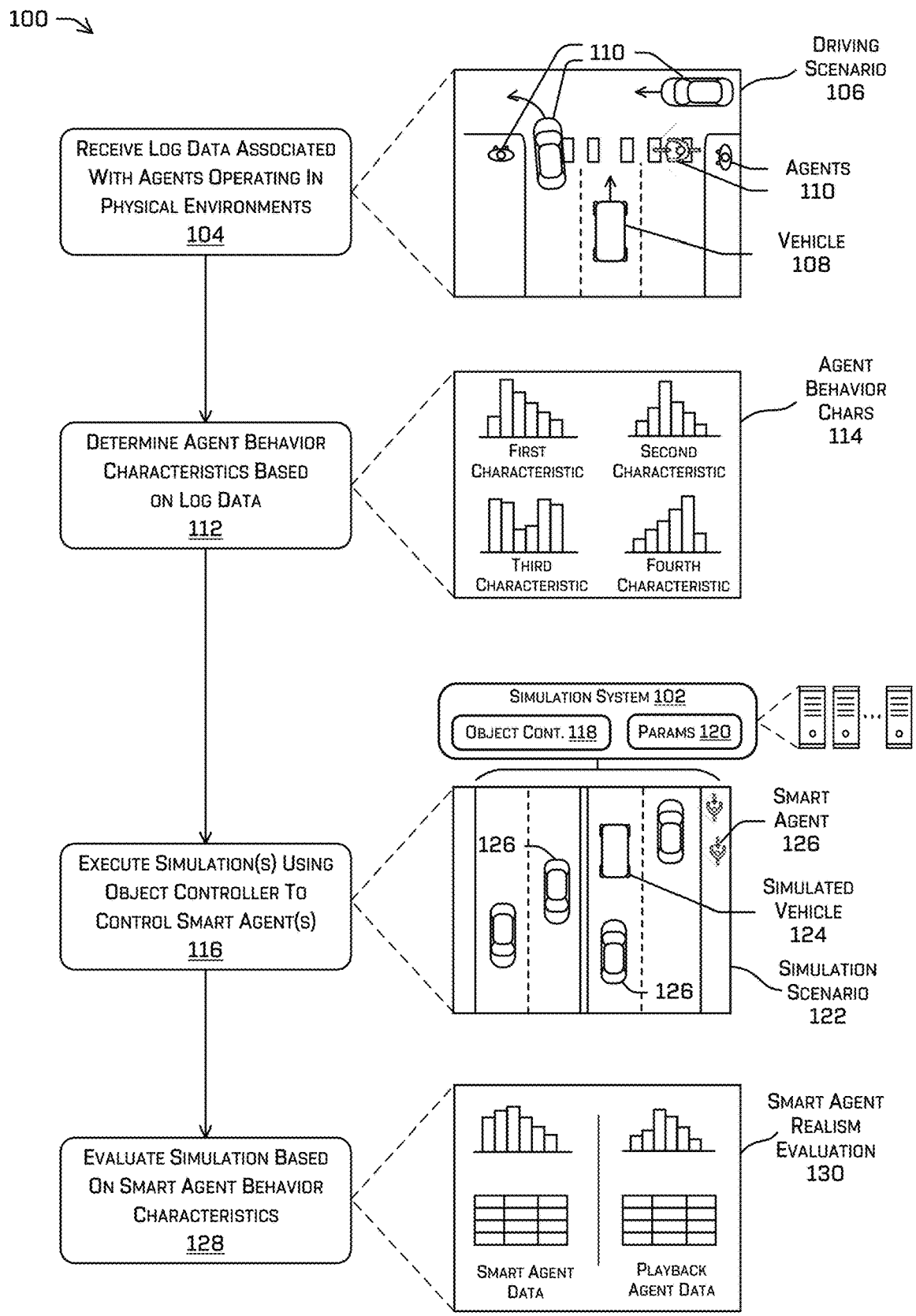
FIG. 1 illustrates an example process of evaluating a simulation by comparing behavior characteristics of smart agents in the simulation to behavior characteristics of playback agents within driving log data, in accordance with one or more implementations of the disclosure.

As discussed above, behavior of agents and other static or dynamic objects in an environment may be scenario dependent. As a result, driving log data indicating the behavior of a particular agent (e.g., a vehicle, bicycle, pedestrian, animal, etc.) in one scenario may not be representative of how the agent would behave in similar scenarios. For example, a minor change to a driving environment or the objects in the environment may result in a significant change to the driving route and/or behaviors of an agent traversing the environment. Log data may therefore be insufficient or incomplete for simulating realistic agent behaviors during driving simulations, and analyzing vehicle control systems based on those simulations.

This application relates to techniques for executing driving simulations, during which parameterized object controllers are used to control "smart" agents (i.e., agents that more intelligently react to varied situations and scenarios), and evaluating the smart agent behaviors within the simulations to validate the parameters used by the object controllers and/or determine the efficacy of the simulations. As described in various examples below, a simulation system may receive log data captured by vehicles operating in physical environments, and may analyze the log data determine both observable and non-observable behavior characteristics (described in detail below) of the non-simulated agents (e.g., other vehicles, bicycles, pedestrians) in the environment. When performing simulations, the simulation system may execute object controllers to control simulated smart agents based on operational parameters that may determine the movements, decisions, and reactions of the smart agents during the simulations. In some examples, the simulation system may determine a particular parameter set to control a smart agent during a simulation, based on the object type of the smart agent, location data, and/or other characteristics of the simulated scenario. The simulation system may aggregate the simulation log data for a battery of simulations to determine the behavior characteristics of smart agents within one or more simulation scenarios. The behavior characteristics of the simulated smart agents may be compared to the corresponding behavior characteristics of non-simulated agents operating in actual physical environments, to determine a score representing the degree of smart agent realism within the simulations. Based on the degree of smart agent realism, the simulation system may determine the efficacy of the simulation, including whether or not to validate the simulation results (e.g., assert that the simulation is realistic enough for testing, for example, a vehicle controller or other system under test in simulation). The simulation system also may determine whether or not to validate the object controllers and/or the operational parameters used by the object controllers to control the smart agents, or whether to modify the operational parameters and re-execute the simulations with the modified operational parameters.

As used herein, an object controller may include a component and/or model configured to control simulated objects (e.g., a smart agents) during a simulation. An object controller may be configured to evaluate the simulated environment and the objects therein, and make operating decisions to control various behaviors (e.g., movements and decisions) of smart agents, based on sets of operational parameters. Various techniques described herein include performing simulations by a simulation system configured to execute one or more object controllers to control the behaviors of the smart agents within the simulation, and to evaluate the performance of the object controllers (and/or the operational parameters used by the object controllers) in controlling smart agents such as human controlled vehicles, pedestrians, etc., in dynamic simulated environments. In some examples, the object controllers used to control agents during simulations may be implemented as state machines. In such examples, the states of a state machine may correspond to the behavior characteristics of an agent, and the state machine may receive and perform state transitions based on any of the parameters described herein. Additionally or alternatively, object controllers may be implemented as trained neural networks based on learned policies associated with behaviors.

The operational parameters may include data values and/or settings that can be used by the object controller(s) to determine navigation decisions, movements, and/or other behaviors for a smart agent while traversing a simulated environment. For instance, the operational parameters used by an object controller may determine the velocities at which a smart agent moves during a simulation, its acceleration and/or deceleration rates, its following distances, its lateral acceleration rates while turning, its stopping locations relative to stop signs and crosswalks, etc. The operational parameters also may determine the navigation decisions that a smart agent may perform during a simulation, including but not limited to how the smart agent performs route planning, whether or not the smart agent will use bike lanes when determining a route, whether the smart agent will use lane splitting and/or lane sharing, the desired cruising speed of the smart agent relative to the speed limit (based on object type), the maximum possible speed and acceleration of the smart agent (based on object type), the desired distances of the smart agent from other agents in the simulated environment (based on object type), how the smart agent will respond to traffic lights, stop signs (e.g., where the vehicle stops with respect to a stop line, whether or not the vehicle may perform rolling stops, etc.), yield signs, stop lines, school zones, construction zones, when the smart agent uses turn signals, turns on/off lights, and/or engages other vehicle controls, how the smart agent reacts to potential interactions with other simulated objects, and so on.

The simulation system may perform simulations based on a simulated driving scenario, using the object controller(s) and operational parameters to control one or more smart agents during the simulation. The simulation system also may evaluate the performance of the object controllers (and/or operational parameters) used in the simulations, by comparing the behavior characteristics of the smart agents within the simulations with the corresponding behavior characteristics of non-simulated agents (e.g., playback agents) observed in physical environments. The behavior characteristics of non-simulated playback agents and/or smart agents may include any observable behavior, movement, or decision performed by an agent within a real or simulated environment. For instance, behavior characteristics may include any of the observable movements or decisions described above, including those behaviors that can be determined by operational parameters used to control smart agents (e.g., velocities, accelerations, driving and navigation decisions, etc.).

Additionally or alternatively, the behavior characteristics for agents may include patterns of behavior that might not be directly observable based on driving log data or simulation log data, but may be derived or estimated based on one or more observable data. For instance, high-level (or derived) behavior characteristics may include driving styles and/or driver personality types, which may be determined for playback agents and smart agents, based on the underlying observable object behaviors such as velocities, accelerations, following distances, movement jerkiness, adherence to driving rules and right-of-way, etc. Examples of driving styles and/or driver personality types may include, but are not limited to, an aggression metric, a driving skill metric, a reaction time metric, a law abidance metric, etc. Similar movement styles and/or personality types may be determined for non-vehicle agents (e.g., pedestrians, bicycles, etc.), based on the underlying observable behaviors for the different object types.

In some examples, similar techniques may be used to determine behavior characteristics of real (e.g., non-simulated) agents in actual physical environments, and to determine corresponding behavior characteristics for smart agents operating in simulated environments. The simulation system may access driving log data associated with vehicles operating in various physical environments and/or simulation log data associated with smart agents. The log data associated with playback agents and/or smart agents may be stored in data stores within or accessible to the simulation system. The log data may include data logged (e.g., captured, calculated, etc.) by sensor systems of real or simulated vehicles while operating in a physical or simulated environments. In various examples, the log data may include object data associated with one or more objects detected in the environment by the sensors of the vehicle. The detected objects may include static objects (e.g., buildings, bridges, signs, etc.) and/or dynamic objects such as other vehicles (e.g., cars, trucks, trains, etc.), pedestrians, bicyclists, or the like.

Of course, not all agents need be smart agents in various simulations. In at least some examples, such simulations may comprise mixtures of smart agents and passive agents in order to further reduce necessary computational resources. In some such examples, designation between passive and smart agent may be determined based at least in part on whether the agent is likely to impact any testing. Determination of whether an agent (or object) is relevant may be made in accordance with, for example, the techniques described in U.S. patent application Ser. No. 16/530,515, filed Aug. 2, 2019 and entitled "Relevant Object Detection," the entire contents of which are incorporated herein by reference for all purposes.

The simulations generated and performed by the simulation system may include log-based simulations and/or synthetic simulations. In some examples, a simulation system may generate one or more log-based simulations based on the driving log data corresponding to a particular driving scenario. For instance, the simulation system may generate simulations utilizing techniques such as those described in U.S. patent application Ser. No. 16/376,842, filed Apr. 5, 2019 and entitled "Simulating Autonomous Driving Using Map Data and Driving Data," U.S. patent application Ser. No. 16/555,988, filed Aug. 29, 2019 and entitled "Vehicle Controller Simulations," U.S. patent application Ser. No. 17/184,128, filed Feb. 24, 2021 and entitled "Agent Conversions in Driving Simulations," U.S. patent Application Ser. No. 17/184,169, filed Feb. 24, 2021 and entitled "Simulating Agents based on Driving Log Data," the entire contents of which are incorporated herein by reference for all purposes. In examples using log-based simulations, the scenarios upon which driving simulations are generated may be based on driving log data captured in actual physical environments.

In other examples, driving simulations may be generated based on synthetic scenarios created, ab initio, programmatically rather than based on log data from physical environments. For either log-based driving scenarios or synthetic scenarios, a simulation generator may generate a simulation by determining and programmatically simulating the static and/or dynamic objects (e.g., agents) in the environment of the scenario, along with the various attributes and behaviors of the simulated objects. In some instances, when generating a log-based simulation, a simulation system can omit objects represented in the log that do not meet or exceed a threshold level of interaction with the vehicle. By excluding objects that do not meet or exceed the threshold level of interaction with the vehicle, the simulation system can reduce an amount of computational resources required to generate and execute log-based driving simulations.

A driving simulation may be associated with a portion of a scenario (e.g., log-based scenario or synthetic scenario). In some examples, the portion of the scenario may represent a period of time (e.g., 20 seconds, 30 seconds, 45 seconds, etc.) that is less than a total time associated with the entire log or synthetic scenario. For example, a simulation may include a 30 second period of time (e.g., snippet) of a 40-minute log associated with a vehicle operating in a physical environment, though this is just an example and other periods of time associated with the simulation and/or log are contemplated herein.

Driving simulations generated from log-based scenarios or synthetic scenarios may include one or more smart agents operating autonomously or semi-autonomously in the simulated environment. For some simulations, a number of playback agents also may operate within the simulated environment. Playback agents, including simulated vehicles, bicycles, pedestrians, etc., may include agents that are configured to operate entirely based on the log data, and may be configured not to deviate from their behaviors in the log data. Each playback agent may be a simulated object representative of an object detected in the physical environment from which the log-based simulation scenario was generated. In some examples, the simulation system may determine which simulated object(s) to include in the simulation based on a proximity to the vehicle in the physical environment as represented in the log data. In such examples, based on a determination that the associated objects operated within a threshold distance of the vehicle in the physical environment, the simulation system may include corresponding simulated objects in the log-based simulation.

As noted above, certain simulations may include one or more smart agents that are controlled by an object controller based on a set of operational parameters. Unlike playback agents, smart agents may deviate from their respective positions indicated by the log data, and may be autonomously or semi-autonomously controlled by the object controllers. In some cases, an object controller may be configured to control a smart object in a simulation based on the object type of the smart agent. The object type of a smart agent may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). In at least one example, the object controller may be configured to control smart objects representative of humans operating cars, bicycles, and themselves (e.g., pedestrians), based on various sets of operational parameters that may be associated with different scenarios, different object types, and/or different locations.

During a simulation, the simulation system may execute (e.g., run) the simulation, including selecting operational parameters and executing object controller(s) to control the smart objects within the simulation. While the simulation is running, the simulation system may be configured to determine values of observable behaviors for each smart object at periodic time intervals (e.g., every 0.1 second, every 1 second, etc.). In some examples, the simulation system may determine the values of the observable behaviors at the time intervals in which each smart object is relevant to the vehicle. Based on the various observable behaviors of the smart agent(s), including multiple observations during a simulation and/or multiple simulations based on a same or similar scenario, the simulation may aggregate the observable behaviors and determine the overall behavior characteristics for the smart agents. In some cases, the same behavior characteristics may be determined for smart agents as were determined for playback agents, and both sets of behavior characteristics may be based on aggregations of log data with many different agent behavior observations. As described below in more detail, the behavior characteristics for playback agents and/or smart agents may be represented in various ways, including averages, histograms, or other distributions based on the aggregated observations of the agents. Additionally, as described below, the behavior characteristics for playback agents and/or smart agents may be associated with particular object types, particular scenarios, and/or particular locations or location types.

In some examples, the behavior characteristics determined for a smart agent may represent an aggregation of metrics associated with an object controller that controls one or more smart agents over a plurality of simulations (e.g., a battery of simulations). Individual simulations within a battery of simulations may correspond to different portions of a driving log from a vehicle operating in a physical environment. Additionally or alternatively, the simulation system may perform multiple simulations based on similar or identical simulation scenarios, by applying small modifications to object starting locations, speeds, trajectories, accelerations, etc., and/or converting different combinations of playback agents to smart agents for different simulation runs. In such examples, the simulation system may determine aggregate metrics for behavior characteristics associated with an object controller (e.g., mean, minimum, maximum, standard deviation, mode, etc.), based on an average value of a metric associated with each smart agent controlled by the object controller, in each simulation in the battery of simulations. In some examples, the simulation system may determine the aggregate behavior characteristic metric associated with the object controller based on a minimum or maximum value of the metric associated within the battery of simulations (e.g., a minimum or maximum distance that a smart object deviated from the expected realistic behavior of the playback agents), or any other statistic generated.

After executing the simulation for a period of time, the simulation system may evaluate the results of the simulation (e.g., the performance of vehicle control systems with respect to required vehicle behaviors or responses to the simulation), and also may determine and evaluate the behaviors of the smart objects in the simulation. To evaluate the behaviors of the smart objects (which also may represent an evaluation of the object controller(s) and operational parameters used to control the smart objects), the simulation system may compare the behavior characteristics of the smart objects with the corresponding behavior characteristics of playback agents based on driving log data. When the simulation system determines that the behavior characteristics of the smart agents in simulation battery satisfies a threshold (e.g., is equal to or less than a threshold difference), in comparison to the behavior characteristics of a set of playback agents, the simulation system may validate the set of operational parameters used to control the smart agents during simulation battery. Additionally or alternatively, the simulation system may validate the object controller(s) and/or the simulation battery.

Based on the comparison between the smart agent behavior characteristics and associated playback agent behavior characteristics, the simulation system may determine a score representing the performance of the object controller and/or the operational parameters in controlling the smart agents in a realistic (e.g., human-like) manner. The simulation system may output the score, and/or additional scores indicating the efficacy of the simulation itself based on the agent realism scores associated with the smart objects in the simulation. As an example, a vehicle controller of a simulated vehicle may have a high pass rate after a battery of simulations, but the simulation system may determine that the simulations had a relatively low agent realism score based on the behavior characteristics of the smart agents. In this example, the simulation system may determine that the simulations were relatively ineffective because they did not reflect realistic driving scenarios, and as a result, may determine that the vehicle controller has not been adequately tested.

In some examples, the simulation system may compare the smart agent behavior characteristics (and/or other simulation metrics) to behavior characteristics of real (e.g., non-simulated) agents in actual physical environments, to determine a score (or metric) representing the degree of smart agent realism within the simulations. Based on the smart agent realism score, the simulation system may output an indication of validity of the object controllers and/or the operational parameters used by the object controller(s). Additionally or alternatively, the simulation system may output a score associated with the efficacy of the simulation. The simulation efficacy score (e.g., based on smart agent realism) may be distinct from the simulation result (e.g., whether or not the vehicle controller passes or fails the simulation conditions).

When the simulation system determines that the object controller and/or operational parameters used for a battery of simulations are valid (e.g., effective in accurately simulating realistic agent behaviors), the simulation system may utilize the same object controller and parameters in additional simulations used to test a vehicle controller, such as those configured to control autonomous or semi-autonomous vehicles. In some cases, the simulation system may incorporate a validated object controller and/or parameters into simulations generated to evaluate the performance of vehicle controllers, such as those described in the U.S. Patent Applications incorporated herein above as well as U.S. patent application Ser. No. 17/136,938 filed Dec. 29, 2020 and entitled "Vehicle Controller Validation," the entire contents of which are incorporated herein by reference for all purposes.

The techniques discussed herein may improve the functioning of a simulation computing system (e.g., simulation system) in many ways. For example, the simulation system described herein may evaluate the performance of smart objects operating within simulations, to determine the degree to which the smart objects accurately represent realistic (e.g., human-controlled) agents. The evaluation of vehicle control systems can be improved by scoring and/or weighting driving simulations, based not only on the results of the simulation but also on the degree of agent realism of the smart agents. The simulation system may withdraw from consideration or down-weight results of simulations that do not meet an agent realism threshold for smart agents. As such, the simulation system may focus on simulations with greater agent realism and may reduce the total number of simulations required for sufficiently evaluating vehicle control systems in some examples. Additionally, by modifying (e.g., optimizing) operational parameters so that smart objects more accurately represent non-simulated objects within physical environments, the simulation system may reduce the amount of noise associated with simulation evaluations, thereby increasing the accuracy of the performance metrics determined for the vehicle control systems. Accordingly, the simulation computing system may be configured to reduce an amount of computing resource overhead and data used in simulations, while improving the accuracy of the simulation-based analysis of vehicle control systems, thereby improving the performance of the simulation computing system in validating object controllers and determining the efficacy of simulation batteries.

Once validated, a set of operational parameters used by an object controller may control one or more smart objects that may be introduced into additional simulations for testing the performance of a vehicle computing system. Because the smart objects may be included in a simulation in which a real object did not exist, the techniques described herein also may enable an increased breadth of scenario evaluation. As such, the techniques described herein may improve the safety performance of autonomous vehicles.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 depicts an example process 100 of executing a log-based driving simulations, including converting playback agents to smart agents at one or more times during the simulation. In various implementations, some or all of the operations in process 100 may performed by driving simulation systems, such as simulation system(s) described in more detail below.

At operation 104, a simulation system, such as simulation system 102 may receive log data associated with one or more agents operating in physical environments. The log data received in operation 104 may include any movement or operational data associated with objects in an environment. The log data may include driving log data representing non-simulated objects operating in real physical environments, and/or simulation log data representing playback agents within simulations. In some examples, the log data may correspond to a driving scenario 106, during which a vehicle 108 may captures and/or calculates the log data using sensor systems while operating in a physical or simulated environments. The log data may include data representing other dynamic objects detected within the environment, such as agents 110 (e.g., non-simulated or playback agents), which may include other vehicles, pedestrians, bicycles, animals, etc.

The log data received in operation 104 may include data observed and/or perceived by the vehicle 108, such as data identifying characteristics of the environment and/or other objects (e.g., agents 110) detected in proximity to the vehicle 108. For instance, for each agent 110 detected in the environment, the vehicle may detect and/or determine the agent's classification, size, shape, position, location, trajectory, velocity, acceleration, jerk, and the like, at periodic time intervals (e.g., every 0.1 second, every 0.05 seconds, every second, etc.) during the driving scenario.

In some examples, the log data may include an object type of the agent 110. The object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). The log data also may include an object trajectory associated with the agent 110. The object trajectory may include a direction of travel, a speed, an acceleration, a jerk, or the like of the object 110 at a particular times during the driving scenario 106. In some examples, the data may include a plurality of object trajectories associated with a plurality of times of the log data. In at least one example, the plurality of times may include times at a periodic interval. In various examples, the log data also may include locations, positions, and/or orientations of the agent 110 associated with an operation of the agent 110 in the environment. Additionally or alternatively, the log data may include event data associated with events observed by the vehicle 108, such as accidents or near accidents, traffic violations, crossing or jaywalking pedestrians, cyclists, or animals, weather anomalies, construction zones, detours, school zones, and the like. The event data may be associated with one or more of the agents 110, and the events and/or agent behaviors may be designated from a list of events and/or agent behaviors that are useful for driving simulations.

At operation 112, the simulation system 102 may determine one or more agent behavior characteristics based on the log data received in operation 104. In various examples, the simulation system 102 may determine one or more behavior characteristics associated with an individual agent 110 detected within a driving scenario 106, or may determine behavior characteristic based on aggregated data associated with multiple different agents 110.

As noted above, the behavior characteristics determined in operation 112 may include data metrics associated with any of the observable movements or decisions described herein, including any of the behaviors discussed above that can be determined based on the operational parameters used to control smart agents. Behavior characteristics can include aggregated data metrics representing the velocities, accelerations, driving/navigation decisions, and the like associated with one or more agents 110. In various examples, the behavior characteristics determined in operation 112 may include, but are not limited to, velocity metrics, acceleration/deceleration metrics, following distance metrics, lateral acceleration metrics, stopping location metrics relative to stop signs, crosswalks, or other objects, etc. Additional behavior characteristics may include metrics representing the navigation decisions of agents 110, including but not limited to metrics representing how an agent 110 performs route planning and traverses an environment, metrics representing when and how an agent 110 uses bike lanes when determining a route, metrics representing when and how an agent 110 uses lane splitting and/or lane sharing, metrics representing a cruising speed of an 110 relative to the speed limit (based on object type), metrics representing a maximum possible speed and acceleration of an agent 110, metrics representing distances maintained by an agent 110 from other objects/agents in the environment, metrics representing when and how an agent 110 responds to traffic lights, stop signs, yield signs, stop lines, school zones, construction zones, metrics representing when and how an agent 110 uses turn signals, turns on/off lights, and/or engages other vehicle controls, metrics representing when and how an agent 110 reacts to potential interactions with other objects, and so on.

As noted above, behaviors characteristics may be determined for an individual agent 110 within a driving scenario 106, or for groupings of associated agents 110 based on a single log data or aggregations of multiple log data (e.g., multiple different driving scenarios). In some examples, different behaviors characteristics may be determined for different object types, based on log data associated with multiple different agents 110 of the object types. In such examples, an object type may correspond to an object class and/or object sub-class. For instance, one set of behaviors characteristics may be determined for a car object type based on multiple car agents 110, another set of behaviors characteristics may be determined for a truck object type based on multiple truck agents 110, another set of behaviors characteristics may be determined for a bicycle object type based on multiple bicycle agents 110, another set of behaviors characteristics may be determined for a pedestrian object type based on multiple pedestrian agents 110, and so on.

Additionally or alternatively, different behaviors characteristics may be associated with different locations (e.g., regions) and/or types of locations, based on log data captured from driving scenarios from different locations or types of locations. For example, the log data received in operation 104 may be aggregated into different groups associated with different driving regions (e.g., different countries, cities, states, counties, etc.), different types of driving locations (e.g., rural, suburb, or city driving, highway driving, intersection with pedestrians, parking lot, school zone, construction zone, curved roads, hills, four-way stops, two-way stops, and the like etc.), and/or different types of driving conditions (e.g., night driving, low-visibility driving, driving in rain or snow, etc.).

In various examples, different sets of behavior characteristics may be determined for different combinations of object types, driving locations/location types, and/or driving conditions. For instance, one set of agent behavior characteristics may be determined for trucks during on highways in rain, another set of agent behavior characteristics may be determined for bicycles at 4-way stop intersections, another set of agent behavior characteristics associated with cars driving at night in the city of Las Vegas, and so on.

A behavior characteristic associated with an agent 110 (or a grouping or classification of agents) may be based on multiple observations (periods of time, different scenarios, etc.) of one or more agents within the log data of one or more driving scenarios. In various examples, a behavior characteristic may be represented as a histogram, a distribution, and/or an average of multiple metrics of the behavior characteristic determined from the log data. As illustrated in this example, the behavior characteristics determined in operation 112 may be represented as a set of histograms 114. The histograms 114 may include, for example, a first histogram representing a velocity behavior characteristic, a second histogram representing an acceleration behavior characteristic, a third histogram representing a following distance behavior characteristic, a fourth histogram representing a stopping distance behavior characteristic, and so on.

As illustrated in these examples, the behavior characteristics determined in operation 112 may be associated with observable agent behaviors (e.g., locations, velocities, trajectories, accelerations, jerks, etc.). Additionally or alternatively, behavior characteristics may be associated with patterns of agent behavior that might not be directly observable, but can be derived or estimated based on observable agent behaviors. For instance, behavior characteristics determined in operation 112 may include metrics (e.g., histograms, averages or distributions) representing agent driving styles and/or agent personality types. Examples of behavior characteristics associated agent driving styles and/or agent personality types may include, but are not limited to, an agent aggression behavior characteristic, an agent driving skill behavior characteristic, an agent reaction time behavior characteristic, an agent law abidance behavior characteristic, etc. For instance, the simulation system 102 may analyze the various observable data for one or more agents 110 to determine a level of aggressive behavior data (e.g., in a spectrum of conservative to aggressive behaviors), a level of law-abiding behavior (e.g., coming to a complete stop at a stop sign, rolling through stop signs, operating within speed limits, etc.), etc., and may use rules to determine metrics for various derived behavior characteristics.

At operation 116, the simulation system 102 may execute one or more simulations, using object controller(s) 118 and operational parameters 120, to control one or more smart agents during the simulations. In various examples, one or more simulations may be executed based on a simulation scenario 122, in response to a request or instruction to perform a simulation battery using the simulation scenario 122 to evaluate an autonomous vehicle controller. As noted above, the simulation system 102 may generate the simulation scenario 122 based on the data (e.g., log data), such as utilizing the techniques described in the U.S. Patent Applications incorporated herein by reference above, or may generate the simulation scenario 122 based on a synthetic scenario created, ab initio, programmatically rather than based on log data from a physical environment.

As illustrated in this example, the simulation scenario 122 may include a simulated vehicle 124 controlled by one or more vehicle controllers (or control systems). Simulations based on the simulation scenario 122 can be used to test and validate the functionality of the vehicle control systems, by evaluating the behaviors (e.g., decisions and movements) of the simulated vehicle 124, in response to the simulated environment and the other objects operating within the simulated environment. In this example, the simulation includes a number of smart agents 126, which are agents configured to be controlled by the object controller(s) 118, based on operational parameters 120. In this example, the smart agents 126 include at least one bicycle smart agent and at least two vehicle smart agents, but in other examples the object controller(s) 118 may be used to control any number of different smart agents of various different object types (e.g., cars, trucks, pedestrians, bicycles, animals, etc.).

In some examples, simulations also may include one or more playback agents. Playback agents may include simulated objects within a simulated scenario 122, that are configured to operate entirely based on previously recorded log data associated with a non-simulated agent operating in a physical environment. In contrast to smart agents, playback agents may be configured not to deviate from the behaviors in the previous log data, and need not be controlled on-the-fly by object controller(s) 118 during the simulation. In some examples, the simulation system 102 may determine the number of smart agents 126 and the number of playback agents to include in a particular simulation, and may run multiple different simulations based on the same simulation scenario 122 in which different combinations of the smart agents and playback agents are used.

During the simulation, the object controller(s) 118 may control the smart agents 126 through different simulated locations at different simulation times within the simulation scenario 122, based on the object type of the smart agent 126. In some examples, the object controller(s) 118 may be configured to determine one or more accelerations, velocities, yaw rates and/or yaw angles, and the like based on the object type associated with each smart agent 126. The object controller(s) 118 also may determine decisions/actions for each smart agent 126, including lane changes, speed adjustments, adjusting positions in a lane, as well as when to yield, when to stop/re-route, etc.

In various examples, the object controller(s) 118 may be configured to control the smart agents 126 based on one or more operational parameters 120. In some examples, the object controller(s) 118 may determine the operational parameters 120 based in part on the object type. The operational parameters 120 may include a velocity profile (e.g., lateral and/or longitudinal), an acceleration profile (e.g., lateral and/or longitudinal), a yaw profile, and/or other movement profiles (e.g., delay time at a stop sign, yielding behaviors, etc.). The operational parameters 120 also may include profiles for determining trajectories, making driving/navigation decisions, perform route planning, and the like. Additionally or alternatively, the operational parameters 120 may represent vehicle characteristics, including but not limited to curb weight, number of passengers, acceleration/braking capabilities, mechanical issues, and/or different route planning algorithms. The object controller(s) 118 may determine the parameter(s) utilizing techniques, such as those described in U.S. patent application Ser. Nos. 16/555,988 and 17/184,128, the entire contents of which are incorporated herein by reference above.

In some examples, the object controller(s) 118 may determine the operational parameters 120 based on the agent behavior characteristics determined in operation 112. For instance, the operational parameters 120 for each smart agent 126 may be determined based in part on the object type of the smart agent 126, as well as the driving conditions and/or location(s) associated with the simulation scenario 122. In some examples, the behavior characteristics of a smart agent (e.g., the level of aggressive behavior, the level of law-abiding behavior, the level of driving skill, and/or other behaviors associated with the smart agent 126) may be represented as operational parameters 120, and the object controller(s) 118 may be configured to determine the decisions and movements for the smart agents based on the operational parameters 120. Additionally or alternatively, the object controller(s) 108 may be configured to control the smart agents 126 according to default operational parameters 120 based on an object type. The default operational parameters 120 may include parameter(s) associated with average object behaviors (e.g., average speed, average accelerations, average amount of jerk, average yaw, etc.).

When a simulation includes multiple different smart agents 126, as in illustrated example for simulation scenario 122, the object controller(s) 118 may use the same set of operational parameters 120 or different sets of parameters for controlling the different smart agents 126. In some instances, different object controller(s) 118 may be associated with different object types. For a particular object type (e.g., cars), an object controller 118 may determine a set of operational parameters 120 for a smart agent 126 of that object type by determining averages of the behavior characteristics determined in operation 112 for that object type. In other examples, the object controller 118 may determine operational parameters 120 for a smart agent by sampling from a histogram 114 or distribution of behavior characteristics associated with the object type.

In various examples, when a simulation includes multiple smart agents 126 of the same object type (e.g., multiple cars, multiple pedestrians, etc.), the object controller 118 may determine operational parameters 120 for the smart agents 126 based on a desired distribution of behavior characteristics. For instance, for multiple smart agent vehicles in a simulation, the object controller 118 may determine a desired distribution of 20% high aggression drivers, 40% low aggression drivers, 50% law-abidance drivers, 30% highly inattentive drivers, and so on.

At operation 128, the simulation system 102 may evaluate the simulation executed in operation 116, based in part on the behavior characteristics of the smart agents 126 operating within the simulation. In various examples, the simulation system 102 initially may determine one or more behavior characteristics of the smart agents 126, based on observing the behaviors of the smart agents 126 during one or more simulations. The simulation system 102 then may compare the behavior characteristics of the smart agents 126 to the agent behavior characteristics determined based on log data in operation 112.

In some examples, the simulation system 102 may receive simulation log data associated with the smart agents 126, after running one or more simulations based on a simulation scenario 122. To determine the behavior characteristics of the smart agents 126, the simulation system 102 may use similar or identical techniques to those used to determine the behavior characteristics of non-simulated and/or playback agents, described above in operation 112. In some cases, the simulation system 102 may aggregate the observations from the simulation logs for each different smart agent 126, after running a battery of simulations, to determine a different set of behavior characteristics associated with each smart agent 126. In other examples, the simulation system 102 may aggregate the observations for multiple smart agents having the same object type, to determine different sets of behavior characteristics that represent each different object type of the smart agents 126 (e.g., cars, trucks, bicycles, pedestrians, etc.). In either example, the observations of the decisions and/or movements of smart agents 126 by the simulation system 102 may be collected for a single simulation or over a battery of multiple simulations. When determining smart agent behavior characteristics based on data from multiple simulations, the multiple simulations may be multiple executions of the same simulation scenario 122, or may include multiple simulations of different simulation scenarios (e.g., different simulation scenarios having similar locations, driving conditions, etc.).

After determining one or more behavior characteristics associated with one or more smart agents 126 in operation 128, the simulation system 102 may compare the behavior characteristics to the corresponding behavior characteristics determined in operation 112 for the playback and/or non-simulated agents. Various techniques may be used to represent behavior characteristics of smart agents and/or of playback or non-simulated agents, based on aggregations of multiple observed behaviors. For instance, behavior characteristics of smart agents 126 may be represented as averages, histograms, and/or distributions, which may be compared to other averages, histograms, and/or distributions representing the behavior characteristics of playback or non-simulated agents.

When the behavior characteristics are represented as histograms 114, the simulation system 102 may perform one or more different histogram comparison techniques to compare the behavior characteristics determined for the smart agents 126, with the behavior characteristics determined in operation 112 for the playback and/or non-simulated agents. For example, box 130 represents an evaluation between a first histogram representing a behavior characteristic of playback and/or non-simulated agents and a second histogram representing a behavior characteristic for one or more smart agents 126. The data in the histograms in box 130 may represent any of the behavior characteristics described herein, including but not limited to vehicle velocities, accelerations, various driving behaviors (e.g., following distances, stopping locations, trajectory or route determinations, etc.), vehicle characteristics (e.g., vehicle weights, capabilities, numbers of passengers, mechanical issues, etc.), and/or personality types (e.g., aggressiveness, law-abidance, skill, etc.). The histogram comparison techniques that may be used in operation 128 may include, but are not limited to, a chi-squared test, a Kolmogorov-Smirnov test, and/or a two-sample t-Test. Additionally or alternatively, the simulation system 102 may compare histograms using various superimposition techniques on histograms, and/or by comparing various distances/dimensions between the histograms (mean, standard deviation, range, etc.).

In some examples, a pair histograms representing a single behavior characteristic may be compared (e.g., using the various comparison techniques described herein), to evaluate the behavior of the smart agents with respect to a set of playback/non-simulated agents. Additionally or alternatively, a first group of multiple histograms representing a multiple behavior characteristics for the playback/non-simulated agents may be compared to a second group of corresponding histograms determined for the smart agents. For instance, the difference metrics for individual pairs of corresponding histograms (e.g., histograms associated with the same behavior characteristic) may be summed or otherwise aggregated. In these examples, by comparing groups of multiple histograms representing multiple behavior characteristics (rather than individual pairs of histograms representing a single behavior characteristic), the simulation system 102 may determine a holistic difference between the combination of behavior characteristics of the smart agents in contrast to those of the playback/non-simulated agents.

In addition to (or instead of) comparing histograms representing behavior characteristics, the simulation system 102 also may determine and compare additional metrics associated with the executed simulations to the corresponding metrics from real world (e.g., non-simulated) driving scenarios. For instance, in operation 128 the simulation system 102 may compare one or more vehicle safety metrics (e.g., vehicle-vehicle or vehicle-object interactions, near misses, etc.) and/or or passenger comfort metrics (e.g., instances of vehicle jerkiness, instances of rapid acceleration or deceleration, etc.). The vehicle safety and/or passenger comfort metrics may be aggregated for a battery of simulations based on a simulation scenario 122 (and/or multiple batteries based on multiple simulation scenarios), and compared to corresponding metrics captured within vehicle logs for real world driving scenarios. In various examples, the simulation system 102 may compare vehicle safety and/or passenger comfort metrics as aggregated instances of particular events, rates of events over time, and/or rates of events based on mileage. The comparisons of behavior characteristics (e.g., histograms) and/or vehicle safety or passenger comfort metrics, also include aggregating the data into groups based on classifications of driving regions/locations (e.g., different countries, cities, states, counties, etc.), types of driving and simulation scenarios (e.g., rural, suburb, or city driving, highway driving, intersection with pedestrians, parking lot, school zone, construction zone, curved roads, hills, four-way stops, two-way stops, and the like etc.), and/or different types of driving conditions (e.g., night driving, low-visibility driving, driving in rain or snow, etc.).

After evaluating the behavior characteristics of the simulated smart agents and/or evaluating additional simulation metrics in operation 128, the simulation system 102 may use these evaluations to perform one or more evaluations on the simulation itself. For example, the simulation system 102 may compare the behavior characteristics of the simulated smart agents to the corresponding behavior characteristics of non-simulated agents to determine smart agent realism scores for one or more simulations (e.g., batteries of simulations and/or simulation scenarios). The smart agent realism scores then may be used to determine the efficacy of the simulation(s). In some cases, a simulation result (e.g., pass, fail, or other score determined based on the performance of the vehicle controller during the simulation) may be validated or not validated based on the realism scores of the smart agents within the simulation. When the behavior characteristics of the simulated smart agents are not sufficiently realistic, the simulation system 102 may determine that the simulation results are invalid and may disregard and/or down-weight the results based on the low degree of smart agent realism. In contrast, when the behavior characteristics of the simulated smart agents are sufficiently realistic, the simulation system 102 may determine that the simulation results are valid and may include and/or or up-weight the results based on the higher degree of smart agent realism.

As described below in more detail, in some examples the simulation system 102 may modify the object controller(s) 118 and/or operational parameters 120 based on the evaluations in operation 128, and some or all of the operations in process 100 may be performed in a loop to optimize the object controller(s) 118 and/or operational parameters 120. For instance, based on a smart agent realism score below a threshold for a set of simulations, the simulation system 102 may modify the operational parameters 120 and re-run the same simulations with the modified parameters. The simulation system 102 may perform multiple and/or periodic modifications of the operational parameters 120 in some cases, after each a set of simulations is re-run and smart agent realism scores are recalculated. In some examples, the simulation system 102 may implement an optimization algorithm to continuously revise the object controller(s) 118 and/or operational parameters 120 until a sufficiently high (e.g., above a threshold) or optimal smart agent realism score is achieved.

Figure 2:
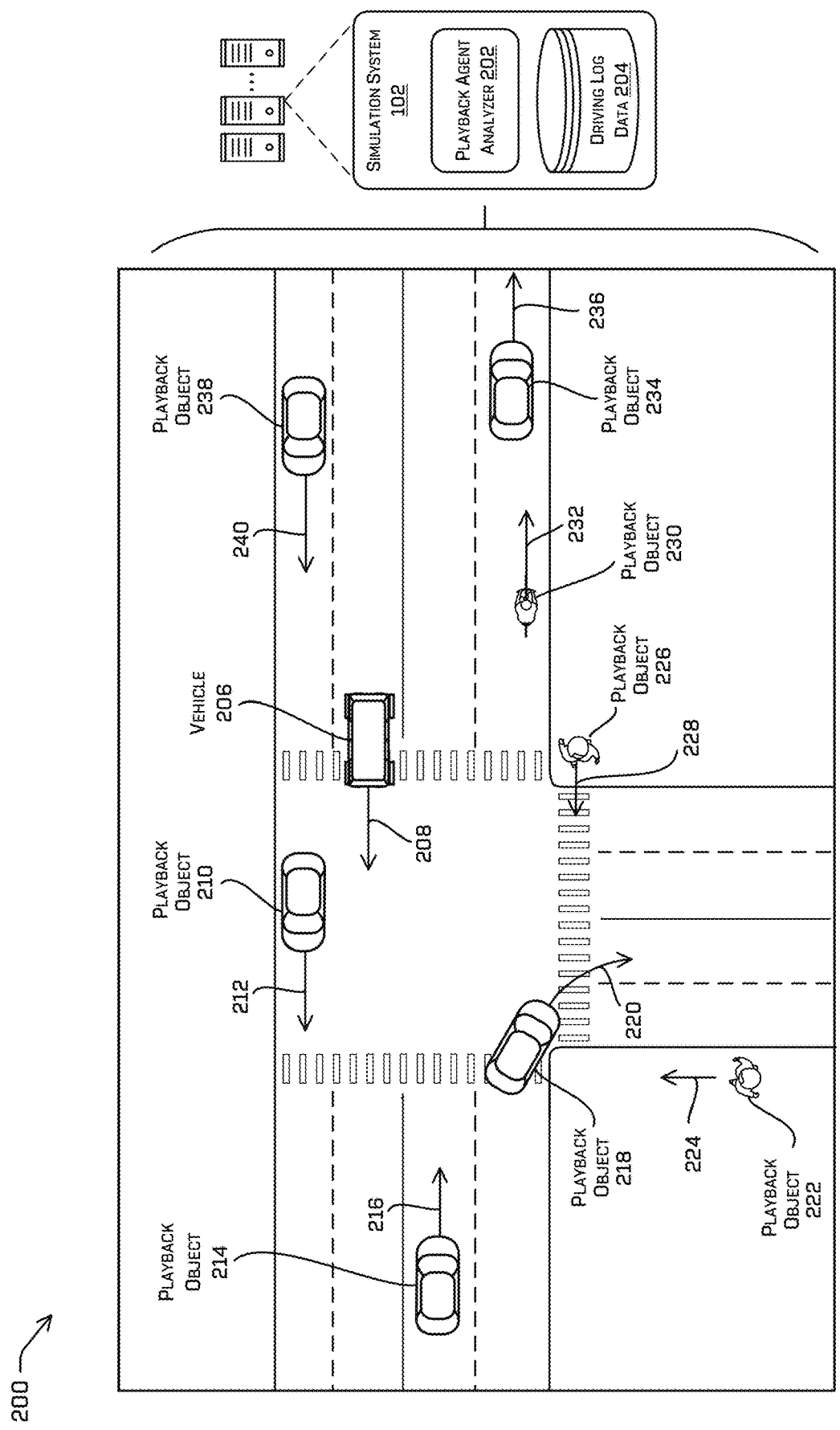
FIG. 2 is an illustration of an example driving scenario based on log data captured by a vehicle traversing a physical environment including additional static and dynamic objects, in accordance with one or more implementations of the disclosure.

FIG. 2 depicts a driving scenario 200 based on log data captured by a vehicle traversing a physical environment. As shown in this example, the simulation system 102 may include a playback agent analyzer 202 and one or more driving log data store(s) 204 configured to store driving log data captured by real (non-simulated) vehicles within real environments. The playback agent analyzer 202 may be configured to analyze one or more driving log data stores 204 depicting non-simulated driving scenarios. Based on the non-simulated driving scenarios, such as the driving scenario 200, the playback agent analyzer 202 may determine behavior characteristics associated with various playback objects (or playback agents) represented in the driving scenario 200. As described in more detail below, the playback agent analyzer 202 may determine various different behavior characteristics associated with a playback object, based on the observable behaviors of that object in the driving scenario 200. Additionally, the playback agent analyzer 202 may aggregate the behavior characteristics for groups of related playback objects, including playback objects having a same/similar object type, playback objects operating in the same/similar driving scenarios, and/or playback objects within the same/similar different regions or locations.

In the illustrated example, the driving scenario 200 may be based on driving log data 204 captured by a vehicle 206 (e.g., a non-simulated and/or human operated vehicle) traversing a physical environment. In this example, driving scenario 200 is depicted at a single point in time, at which multiple different playback objects can be observed by the vehicle 206, and at which the driving log data 204 may capture multiple different observable behaviors (e.g., object locations, poses, velocities, trajectories, interactions, etc.). Although driving scenario 200 is depicted at a single point in time, it can be understood from the context of this disclosure that the driving log data 204 may capture various playback object locations, movements, and behaviors at multiple different time intervals during the driving scenario 200 (e.g., every 0.1 seconds), and the playback agent analyzer 202 may determine the behavior characteristics for each playback object based on multiple observations captured at multiple different times during the driving scenario 200.

In the driving scenario 200 at the illustrated time, the vehicle 206 is driving along a trajectory 208. The vehicle 206 may be an autonomous vehicle and/or human-operated vehicle, and sensors within the vehicle 206 may capture driving log data 104 representing various other playback objects in the environment. For instance, the driving log data 204 captured by the vehicle 206 at the time depicted, may include data representing a vehicle playback object 210 moving at a trajectory 212, a vehicle playback object 214 moving at a trajectory 216, a vehicle playback object 218 moving at a trajectory 220, a pedestrian playback object 222 moving at a trajectory 224, a pedestrian playback object 222 moving at a trajectory 224, a pedestrian playback object 226 moving at a trajectory 228, a bicycle playback object 230 moving at a trajectory 232, a vehicle playback object 234 moving at a trajectory 236, and a vehicle playback object 238 moving at a trajectory 240. The playback objects in the driving scenario 200 may be originally based on non-simulated objects detected by the vehicle 206 when traversing a physical environment, and stored as representative object data within the driving log data 204. As described below, the playback objects may be simulated in future simulations, during which the playback objects may operate based entirely on the driving log data 204 data captured by the vehicle 206, and may not operate autonomously or semi-autonomously as smart agents.

As described above, the playback agent analyzer 202 may use the driving log data 204 associated with the playback objects to determine one or more behavior characteristics of the playback objects. For example, the playback agent analyzer 202 may receive any observable data associated with the objects in the driving scenario 200, including object locations, movements and/or operational behaviors. For each playback object detected in the driving scenario 200, the playback agent analyzer 202 may use the driving log data to determine object's classification, size, shape, position, location, trajectory, velocity, acceleration, jerk, and the like, at periodic time intervals during the driving scenario 200. The playback agent analyzer 202 also may identify observable actions and behaviors for each playback object, such as the trajectories selected and used by the objects in different scenarios, accidents or near accidents, traffic violations, yielding or non-yield behaviors, etc.

Based on the observable driving log data 204, the playback agent analyzer 202 may determine one or more agent behavior characteristics for each of the playback objects in the environment. The behavior characteristics determined by the playback agent analyzer 202 may include any of the various behavior characteristics described herein, including aggregated data metrics representing velocities, accelerations, driving behaviors, navigation decisions, driving styles, personality types, and the like.

In some examples, the playback agent analyzer 202 may aggregate behaviors characteristics based on multiple objects within a driving scenario 200 or across multiple driving scenarios. For instance, the playback agent analyzer 202 may determine behaviors characteristics associated with aggregations of playback objects associated with different locations (e.g., regions) and/or types of locations, different types of objects (e.g., object classes or subclasses, etc.), different types of driving conditions (e.g., night driving, low-visibility driving, driving in rain or snow, etc.), different types of scenarios, etc.

The behavior characteristics determined by the playback agent analyzer 202 for a playback object or aggregation of playback object may be represented as a histogram, a distribution, and/or an average of multiple metrics of the behavior characteristic determined from the log data.

Figure 3:
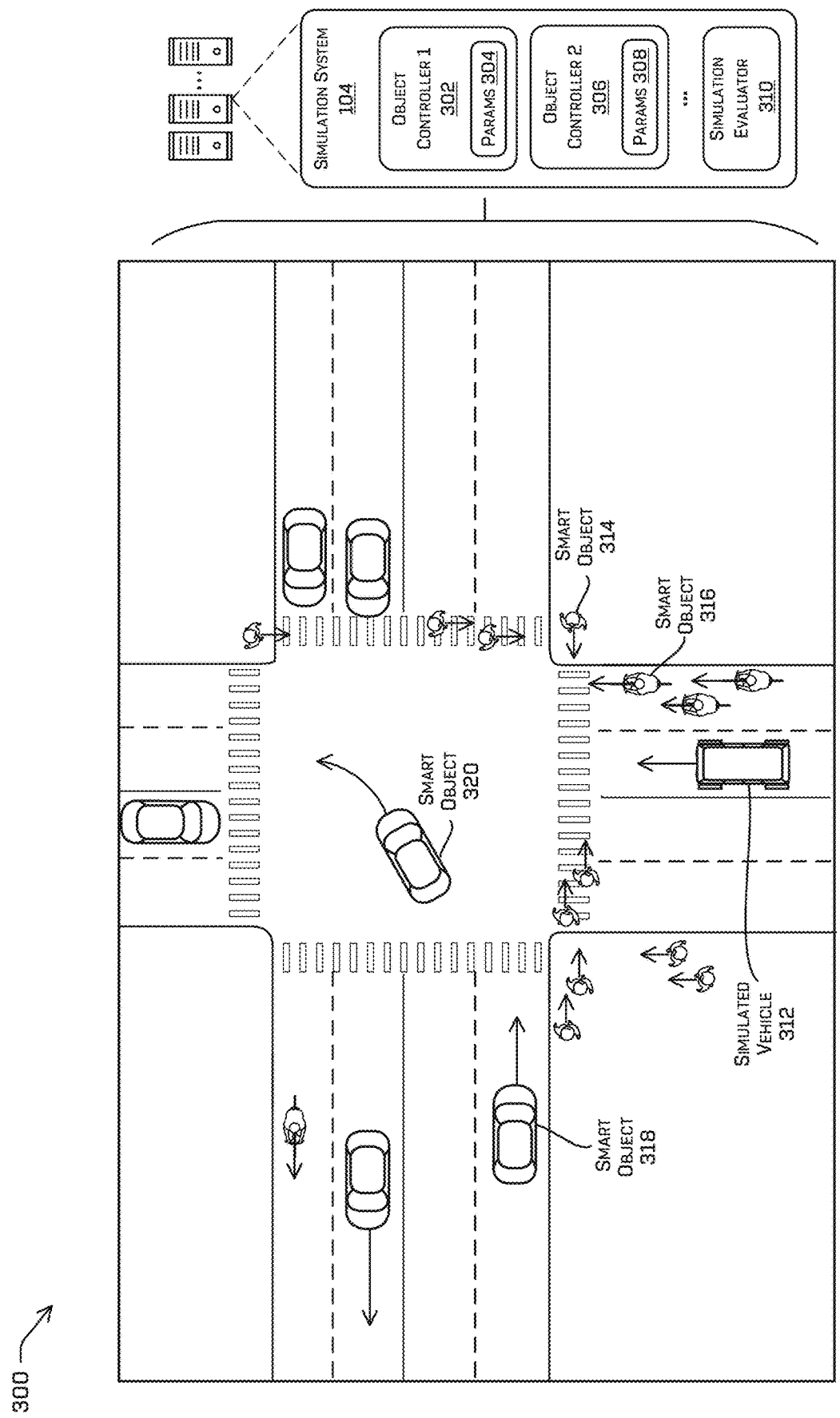
FIG. 3 is an illustration of an example driving simulation in which a number of smart agents are controlled by parameterized object controllers, in accordance with one or more implementations of the disclosure.

FIG. 3 depicts a driving simulation scenario 300 including a simulated vehicle operating within a simulated environment in which a number of smart agents in the simulated environment are controlled by object controllers and operational parameters. As shown in this example, the simulation system 102 may include a number of object controllers (e.g., object controller 302 and object controller 306), configured using one or more sets of operational parameters (e.g., parameters 304 and 308), to control the smart agents during the simulation. The simulation system 102 also may include a simulation evaluator 310 configured to determine the degree of realism of the smart agents in the simulation, and to evaluate the both the performance of the autonomous vehicle controller during the simulation, and the efficacy of the simulation based on the degree of smart agent realism.

In the illustrated example, a simulation based on the simulation scenario 300 is generated and executed by the simulation system 102. At the particular time depicted in the simulation, a simulated vehicle 312 is controlled by an autonomous vehicle controller within the simulated environment. The simulation may be populated with additional simulated agents and other objects, which may include all playback objects, all smart agents, or a combination of playback and smart objects. In some instances, different combinations of playback objects may be converted to smart agents in different simulations based on the same simulation scenario 300, or an individual playback object may be converted to a smart agent during the course of a single simulation. For the simulation shown in the illustrated example, the simulated environment includes a pedestrian smart object 314, a bicycle smart object 316, and a first vehicle smart object 318, and a second vehicle smart object 320.

In various examples, the simulation system 102 may use a single object controller or a combination of object controllers. In some cases, a first object controller 302 may be configured to control a first type of smart objects (e.g., vehicle smart agents), a second object controller 306 may be configured to control a second type of smart objects (e.g., pedestrian smart agents), and so on. Each object controller may use one or more sets of operational parameters to control the behavior characteristics of associated smart agents during a simulation. The sets of operational parameters 304 and 308 may include individual metrics representing to different types of behavior characteristics. As noted above, the metric representing behavior characteristics may be stored as average values for a behavior characteristic, or as a histogram, distribution function, etc. In some cases, an object controller used to control a particular object type (e.g., vehicles, bicycles, pedestrians, animals, etc.) may include multiple sets of operational parameters 304 that correspond to different driving conditions, different regions/locations, different scenario types, and/or different agent personality types.

In various examples, the simulation evaluator 310 may be configured to evaluate the simulation itself and/or the performance of the smart agents during the simulation. For instance, based on determining whether the simulated vehicle 312 performed consistent with one or more predetermined outcomes and/or determining whether any rules were broken or assertions were triggered, the simulation evaluator 310 can determine whether or not the simulation was successful. Additionally, the simulation evaluator 310 may determine metrics corresponding to performance the object controller(s) 302 and 306, and/or for the accuracy of the operational parameters 304 and 308. These metrics may represent one or more differences between the behavior characteristics of the smart agents in the simulated environment, and the corresponding behavior characteristics of associated objects operating in a physical environment (e.g., based on the driving log data 204 analyzed by the playback agent analyzer 202). The evaluations performed by the simulation evaluator 310 may include comparing histograms and/or other behavior characteristics metrics associated with the smart agents or simulations themselves, to the corresponding histograms/metrics of playback agents and/or non-simulated driving scenarios, using the various techniques described herein. The evaluations performed by the simulation evaluator 310 may include evaluations of the degree of smart agent realism provided by the object controller(s) 302 and 306 and sets of operational parameters 304 and 308, and/or may include evaluations of the efficacy of a simulation based on the on the degree of smart agent realism provided.

As noted above, the simulation evaluator 310 also may aggregate the evaluations of simulations, object controller(s) and/or operational parameters over multiple simulations executed based the simulation scenario 300, or multiple similar simulation scenarios. For instance, although the simulation scenario 300 is not identical to or based on the driving scenario 200, the simulation system 102 may determine that these scenarios are similar and therefore the behavior characteristics determined by the playback agent analyzer 202 based on driving scenario 200 may be compared to the behavior characteristics of the smart agents controlled by object controllers 302 and 306.

Figure 4:
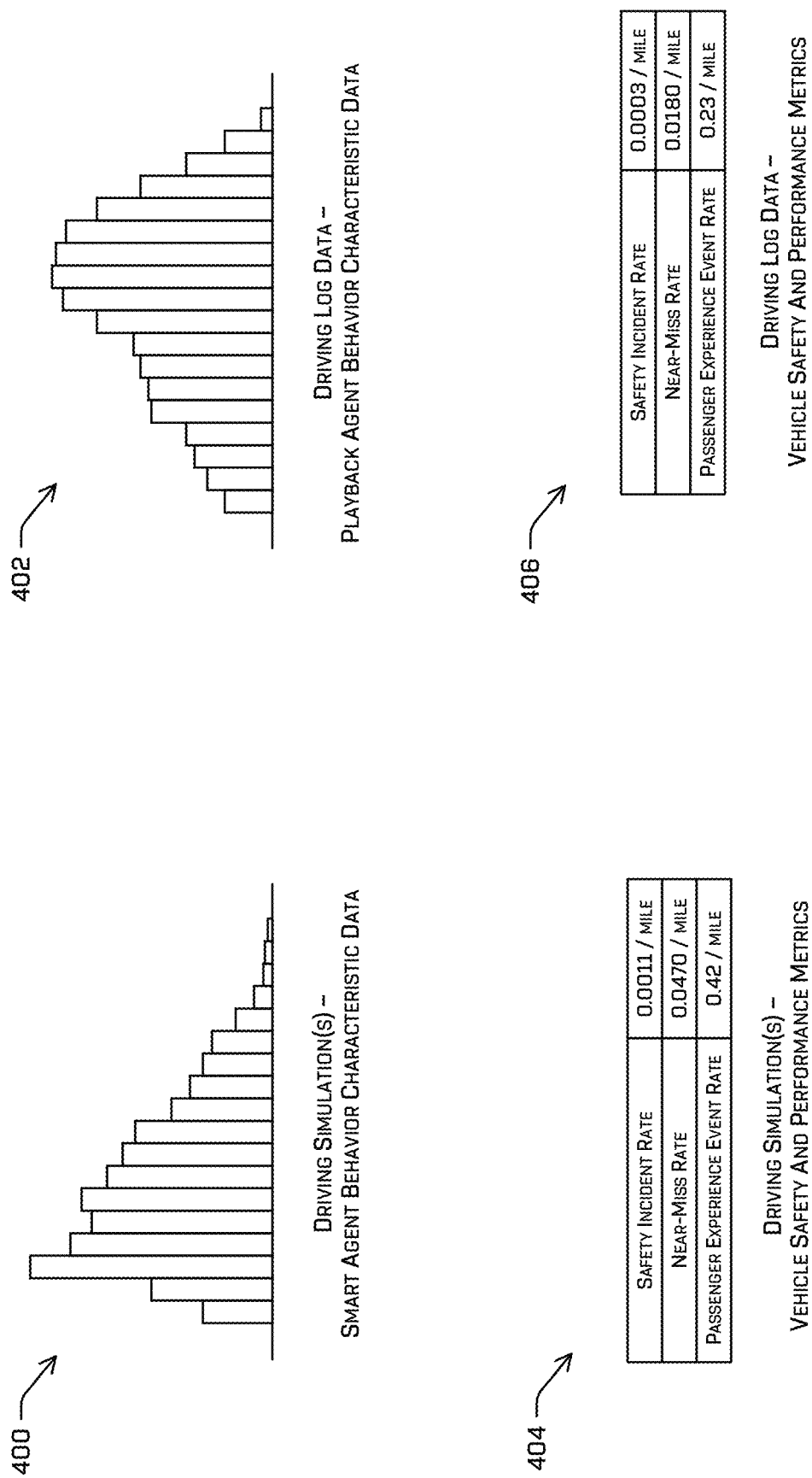
FIG. 4 depicts example data representing aggregated behavior characteristics associated with driving log data and a simulated driving scenario, in accordance with one or more implementations of the disclosure.

FIG. 4 depicts example data representing a set of aggregated behavior characteristics associated with playback objects, and a corresponding set of behavior characteristics associated with simulated smart agents. As noted above, the simulation evaluator 310 may evaluate a simulation or group (e.g., battery) of simulations, based on a comparison of the behavior characteristics of the smart agents operating within the simulations, to the corresponding behavior characteristics of playback objects observed in real world (non-simulated) environments. Based on the comparison of one or more behavior characteristics, the simulation evaluator may determine the degree of smart agent realism provided by the object controllers and/or operational parameters, and/or may determine the efficacy of the simulation itself.

In the illustrated examples, a first histogram 400 may represent one behavior characteristic or a group of related characteristics (e.g., a driving style or agent personality type), determined from the observed behaviors of smart agents during one or more driving simulations. The second histogram 402 may represent the same behavior characteristic or a group of related characteristics, determined from the observed behaviors of non-simulated playback agents during one or more real world driving scenarios. The first histogram 400 and second histogram 402 may be compared using one or more histogram comparison techniques (e.g., chi-squared test, a Kolmogorov-Smirnov test, and/or a two-sample t-Test, superimposition, etc.), to determine how closely the behavior characteristics of the smart agents correspond to the same behavior characteristics of the non-simulated playback agents.

Additionally or alternatively, the simulation evaluator 310 may evaluate the degree of smart agent realism and/or efficacy of a simulation or group (e.g., battery) of simulations, by determining and compare simulation metrics such as vehicle safety metrics and/or passenger comfort metrics. As shown in this example, table 404 includes three separate vehicle safety and performance metrics determined based on an aggregated set of driving simulations. The vehicle safety and performance metrics include a safety incident rate, a near-miss interaction rate, and a passenger experience event rate. Table 406 includes the three corresponding vehicle safety and performance metrics based on non-simulated driving log data. In various examples, the simulation evaluator 310 may compare the vehicle safety and performance metrics determined based on the execution of simulations from one or more simulation scenarios, with the corresponding vehicle safety and performance metrics determined based on driving log data, to determine values representing the smart agent realism and/or simulation efficacy.

Figure 5:
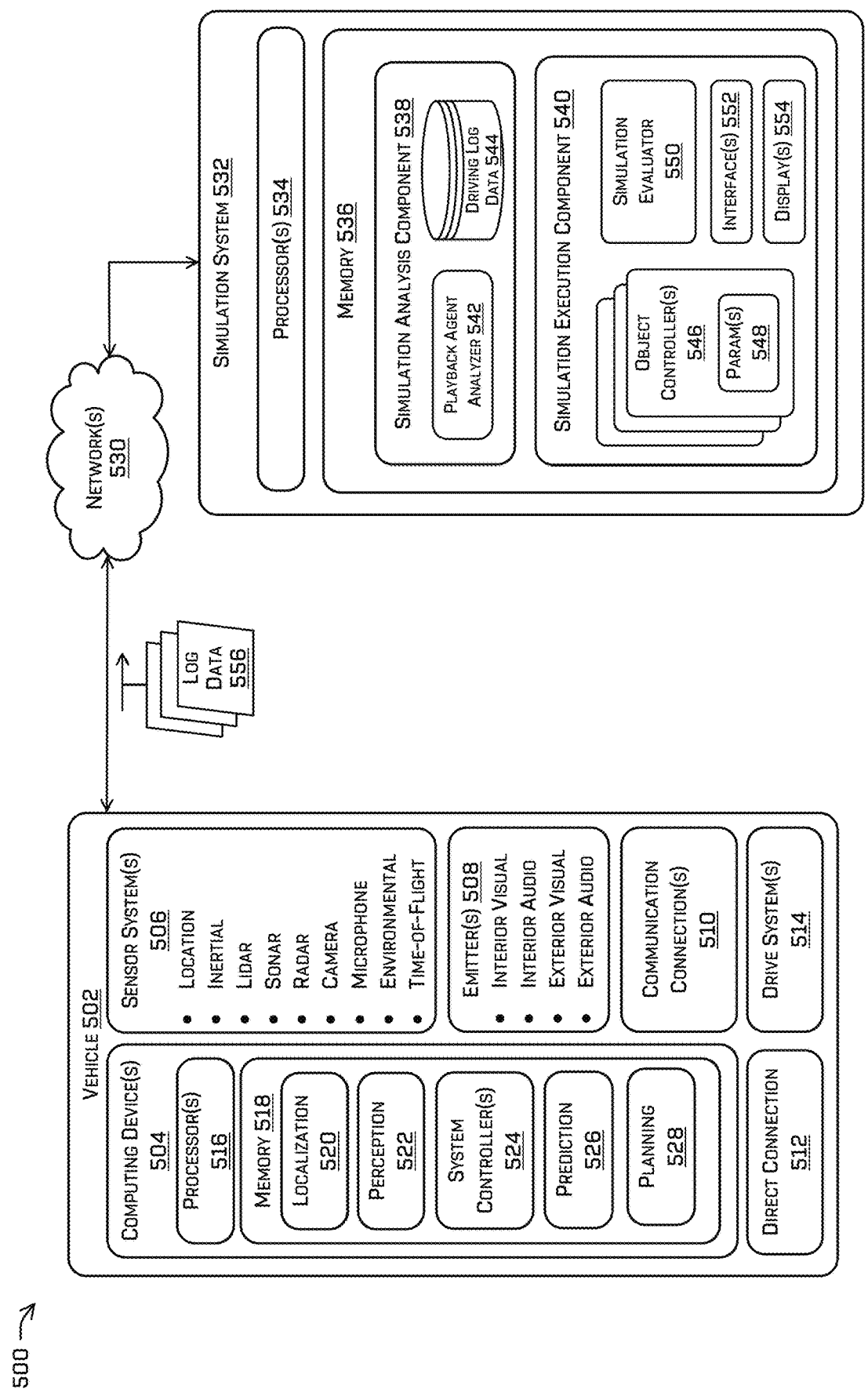
FIG. 5 is a block diagram illustrating an example system, including a vehicle and a simulation system, for implementing various techniques described herein.

FIG. 5 illustrates an example computing environment 500 that may be used to implement the driving simulation systems and techniques described herein. In this computing environment 500 includes a vehicle 502 and a simulation system 532 configured to generate and execute driving simulations. The vehicle 502 may include various software-based and/or hardware-based components of an autonomous vehicle, and may be used to control autonomous vehicles traversing through physical environments and/or simulated vehicles operating within log-based driving simulations. The vehicle 502 may be similar or identical to any or all of the real and/or simulated vehicles or vehicle controllers described herein. The simulation system 532 may be similar or identical to the simulation system 102 described above in reference to FIGS. 1-4. In some examples, the vehicle 502 may correspond to a vehicle traversing a physical environment, capturing and storing log data which may be provided to the simulation system 532 and used to generate a simulations. Additionally or alternatively, the vehicle 502 may operate as one or more separate vehicle control systems, interacting with and being evaluated by the simulation system 532 during a driving simulation.

In at least one example, the vehicle 502 may correspond to an autonomous or semi-autonomous vehicle configured to perform object perception and prediction functionality, route planning and/or optimization. The example vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 502 can include vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more system controllers 524, a prediction component 526, and a planning component 528. Though depicted in FIG. 5 as residing in the memory 518 for illustrative purposes, one or more of the localization component 520, the perception component 522, the system controllers 524, the prediction component 526, and the planning component 528 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for determining that an object is proximate to one or more crosswalk regions and/or for identifying candidate reference lines, as discussed herein.

In some instances, and in general, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the memory 518 can include one or more maps that can be used by the vehicle 502 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed.

In some examples, the vehicle 502 can be controlled based at least in part on the maps. That is, the maps can be used in connection with the localization component 520, the perception component 522, the prediction component 526, and/or the planning component 528 to determine a location of the vehicle 502, identify objects in an environment, and/or generate routes and/or trajectories to navigate within an environment.

In at least one example, the vehicle computing device(s) 504 can include one or more system controllers 524, which can be configured to control steering, propulsion, braking, safety, emitters, communication, and other systems of the vehicle 502. The system controller(s) 524 can communicate with and/or control corresponding systems of the drive system(s) 514 and/or other components of the vehicle 502.

In general, the prediction component 526 can include functionality to generate predicted information associated with objects in an environment. As an example, the prediction component 526 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 526 can generate one or more predicted positions, predicted velocities, predicted trajectories, etc., for such target objects based on attributes of the target object and/or other objects proximate the target object.

In general, the planning component 528 can determine a path for the vehicle 502 to follow to traverse the environment. For example, the planning component 528 can determine various routes and trajectories and various levels of detail. For example, the planning component 528 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 528 can generate one or more trajectories for the vehicle 502 based at least in part on predicted location(s) associated with object(s) in an environment. In some examples, the planning component 528 can use temporal logic, such as linear temporal logic and/or signal temporal logic, to evaluate one or more trajectories of the vehicle 502.

As can be understood, the components discussed herein (e.g., the localization component 520, the perception component 522, the one or more system controllers 524, the prediction component 526, and the planning component 528 are described as divided for illustrative purposes. However, the operations performed by the various components can be combined or performed in any other component. Further, any of the components discussed as being implemented in software can be implemented in hardware, and vice versa. Further, any functionality implemented in the vehicle 502 can be implemented in one or more remoted computing device(s) (e.g., simulation system 532), or another component (and vice versa).

In at least one example, the sensor system(s) 506 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the time of flight sensors can include individual time of flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 530, to the one or more external computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 530. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more system controllers 524, the prediction component 526, and the planning component 528 can process sensor data, as described above, and can send their respective outputs as log data 556, over the one or more network(s) 530, to one or more external computing device(s), such as the simulation system 532. In at least one example, the respective outputs of the components can be transmitted to the simulation system 532 at a particular frequency, after a lapse of a predetermined period of time, in near real-time, etc. Additionally or alternatively, the vehicle 502 can send sensor data to the simulation system 532 via the network(s) 530, including raw sensor data, processed sensor data and/or representations of sensor data. Such sensor data can be sent as one or more files of log data 544 to the simulation system 532 at a particular frequency, after a lapse of a predetermined period of time, in near real-time, etc.

The simulation system 532 may include one or more processors 534 and memory 536 communicatively coupled with the one or more processors 534. In the illustrated example, the memory 536 of the simulation system 532 stores a simulation analysis component 538 configured to receive and analyze driving log data 556 from real (non-simulated) vehicles operating in physical environments, and a simulation execution component 540 configured to perform and evaluate driving simulations. The simulation analysis component 538 may include playback agent analyzer 542 and a driving log data store 544. The playback agent analyzer 542 and driving log data may be similar or identical to the playback agent analyzer 202 and driving log data 204 described above. The playback agent analyzer 542 may include the functionality described herein for determining and aggregating the behavior characteristics of playback agents, based on data from the driving log data store 544. The playback agent analyzer 542 may analyze the driving log data to determine object locations, movements, states, and operations performed by playback agents to determine values for any or all of the various behavior characteristics described herein for the playback agents.

The simulation execution component 540 may include one or more object controller(s) 546 and/or operational parameter(s) 548, which may be similar or identical to the object controller(s) 118 and operational parameter(s) 120 described herein. As described above, the simulation execution component 540 may generate and execute driving simulations, during which the object controller(s) 546 and/or operational parameter(s) 548 may be used to control the behavior characteristics of the smart agents in the simulations. During the execution of a driving simulation, the simulation execution component 540 may execute a set of simulation instructions and generate simulation data. In some instances, the simulation execution component 540 can execute multiple simulated scenarios simultaneously and/or in parallel. This can allow users to edit simulations and execute permutations of the simulation with variations between each simulation, including reviewing and modifying the object controller(s) 546 and/or operational parameter(s) 548 that control the behaviors of the smart agents in the simulations.

As noted above, driving simulations may be performed in order to test and validate the performance of autonomous vehicle controllers, such as those operating on vehicle 502. Additionally or alternatively, the simulation execution component 340 may generate and run simulation(s) responsive to receiving an instruction or a request to validate (e.g., evaluate) an object controller 546 and/or a set of operational parameters 548. In various examples, such request may be received based on a user input via an interface 552 and/or via a message sent via the network(s) 530 from another computing device, such as after performing an update or change to the object controller 546. In some examples, the request may be received based on an instruction to periodically evaluate an object controller 546 and/or set of operational parameters 548.

The simulation execution component 540 may generate the simulation(s) utilizing the techniques described above, and described in the U.S. Patent Applications incorporated by reference above. In some examples, the simulation(s) may include at least one playback vehicle (or other playback agent) and at least one simulated vehicle (and/or other simulated agent). The simulated agents/objects may be configured to be controlled by the object controller(s) 546 using operational parameters 548, while the playback agents/objects may operate based on driving log data 544 (e.g., data captured by the vehicle computing device(s) 504 during operation of the vehicle 502). In some examples the simulated objects may be included in the simulation based on proximity to the vehicle 502. As discussed above, a number of smart objects and playback objects included in the simulation may be determined based on the object controller(s) 546 and/or portion thereof to be evaluated.

In various examples, the simulation execution component 540 may generate the simulation(s) based on input received via the interface 552 and/or from a remote computing device (e.g., via the request and/or instruction). In some examples, the input may include an identifier associated with one or more object controllers 546 and/or sets of operational parameters 548 to be used and/or evaluated, an identifier associated with a log to use in the evaluation, a set of scenarios to utilize for the simulation(s), a location associated with a storage of the set of scenarios, a number of scenarios to be included in the simulation, a percentage of a pre-determined set of scenarios to be included in the simulation, a time duration (e.g., time limitation) of the simulation, and/or a particular pre-determined set of scenarios and/or type thereof to be included in the simulation. In some examples, the input may include an input to evaluate a performance of the object controller 546 with respect to a particular object type. In such examples, the simulation execution component 540 may generate the simulation(s) with smart objects of the particular object type.

In various examples, a simulation evaluator 550 may be configured to run the simulation, using object controller(s) 546 and sets of operational parameters 548 for controlling one or more simulated objects. Based at least in part on determining that the vehicle 502 performed consistent with one or more predetermined outcomes (that is, the autonomous controller did everything it was supposed to do) and/or determining that rules were not broken or assertions were not triggered, the simulation evaluator 550 can determine that the vehicle 502 succeeded. Based at least in part on determining that the vehicle 502 performance was inconsistent with the predetermined outcome (that is, the autonomous controller did something that it wasn't supposed to do) and/or determining that a rule was broken or than an assertion was triggered, the simulation evaluator 550 can determine that the vehicle 502 failed. Accordingly, based at least in part on executing the simulation, simulation data can indicate how the vehicle 502 responds to each simulation, as described above and determine a successful outcome or an unsuccessful outcome based at least in part on the simulation data. In some instances, the predetermined rules/assertions for a driving simulation can be based on the simulation (e.g., traffic rules regarding crosswalks can be enabled based on a crosswalk scenario or traffic rules regarding crossing a lane marker can be disabled for a stalled vehicle scenario). In some instances, the simulation execution component 540 can enable and disable rules/assertions dynamically as the simulation progresses. For example, as a simulated object approaches a school zone, rules/assertions related to school zones can be enabled and disabled as the simulated object departs from the school zone. In some instances, the rules/assertions can include comfort metrics that relate to, for example, how quickly an object can accelerate given the simulated scenario.

Additionally, the simulation evaluator 550 may determine metrics corresponding to performance the object controller(s) 546 and operational parameters 548. These metrics may represent one or more differences between the behavior characteristics of the smart agents in the simulated environment, and the corresponding behavior characteristics of associated objects operating in a physical environment (e.g., based on the driving log data 544 analyzed by the playback agent analyzer 542). The evaluations performed by the simulation evaluator 550 may include comparing histograms and/or other behavior characteristics metrics associated with the smart agents or simulations themselves, to the corresponding histograms/metrics of playback agents and/or non-simulated driving scenarios, using the various techniques described herein. The evaluations performed by the simulation evaluator 550 may include evaluations of the degree of smart agent realism provided by the object controller(s) 546 and sets of operational parameters 548, and/or may include evaluations of the efficacy of a simulation based on the on the degree of smart agent realism provided. As noted above, the simulation evaluator 550 also may aggregate the evaluations of simulations, object controller(s) 546, and/or operational parameters 548 over multiple simulations executed based on a single simulation scenario or multiple similar simulation scenarios.

In various examples, the simulation evaluator 550 may be configured to determine whether the difference(s) associated with the metrics (e.g., behavior characteristics between smart agents and playback agents) meet or exceed a threshold value, such as described above. In various examples, the simulation evaluator 550 may be configured to present data associated with the evaluation, such as an indication of validation, an indication of invalidation, and/or evaluation results (e.g., performance metrics associated with the simulation(s)). In various examples, the simulation evaluator 550 may be configured to provide the data to a user, such as via the interface(s) 552 (and/or display(s) 554) and/or by causing the data to be presented via a display of a remote computing device.

In some examples, the simulation execution component 540 may include a recommendation component configured to identify when the degree of smart agent realism provided by the object controller(s) 546 and/or operational parameters 548 does not satisfy a threshold value (e.g., does not meet or exceed the threshold value), and to generate a recommendation to mitigate the error. Recommendations may include changing object controller(s) 546 and/or modifying the operational parameters 548, after which the simulation execution component 540 may re-execute one or more simulations and re-evaluate the smart agent realism. In some examples, such recommendations may be based on smart agent realism associated with a particular object type and/or a particular simulation scenario. In some examples, to determine updated object controller(s) 546 and/or modified operations parameters 548, the recommendation component may utilize machine learning techniques, heuristics, and/or other methods for identifying the action(s). In some examples, the recommendation may include the actions. The recommendation component may be configured to cause the recommendation to be presented to the user, such as via the interface(s) 552 and/or by causing the recommendation to be presented on the display of the remote computing device.

In various examples, the simulation system 532 may include one or more input/output (I/O) devices, such as via one or more interfaces 552. The interface(s) 552 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view user interfaces associated with the simulation analysis component 538 and/or the simulation execution component 540, such as to input data and/or view results via one or more displays 554. Depending on the type of computing device, such as a user computing device, server computing device, or the like, the display 554 may employ any suitable display technology. For example, the display 554 may be a liquid crystal display, a plasma display, a light emitting diode display, an OLED (organic light-emitting diode) display, an electronic paper display, or any other suitable type of display able to present digital content thereon. In some examples, the display 554 may have a touch sensor associated with the display 554 to provide a touchscreen display configured to receive touch inputs for enabling interaction with a graphical user interface presented on the display 554. Accordingly, examples herein are not limited to any particular display technology.

The processor(s) 516 of the vehicle 502 and the processor (s) 534 of the simulation system 532 can be any suitable processor capable of executing instructions to process data and perform operations as described herein. By way of example and not limitation, the processor(s) 516 and 534 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 536 are examples of non-transitory computer-readable media. The memory 518 and 536 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the simulation system 532 and/or components of the simulation system 532 can be associated with the vehicle 502. That is, the vehicle 502 can perform one or more of the functions associated with the simulation system 532, and vice versa. Further, aspects of the simulator 540 (and subcomponents thereof) can be performed on any of the devices or systems discussed herein.

Figure 6:
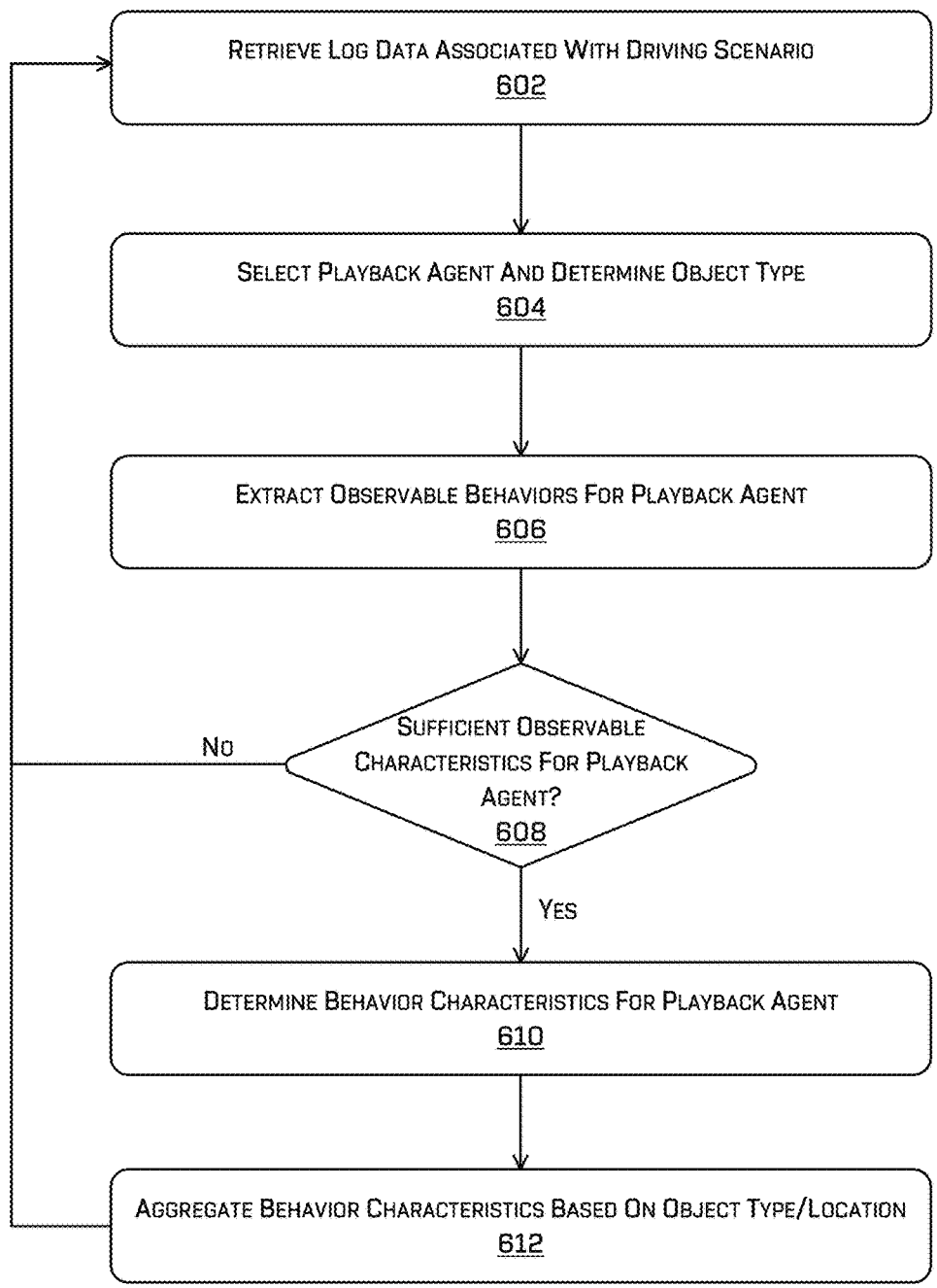
FIG. 6 is a flow diagram illustrating an example process for determining behavior characteristics associated with driving log data, in accordance with one or more implementations of the disclosure.

FIG. 6 is a flow diagram illustrating an example process 600 of determining one or more behavior characteristics of non-simulated and/or playback agents, based on driving log data. In various examples, the operations of process 600 may be performed by one or more components of a simulation system 102, alone or in conjunction with one or more vehicles. For instance, the techniques described herein for analyzing log data and determining behavior characteristics associated with playback agents may be performed by a playback agent analyzer 542 of a simulation analysis component 538, discussed above.

At operation 602, the simulation analysis component 538 may receive driving log data associated with one or more driving scenarios. The driving log data received in operation 602 may include data captured based on objects in real physical environments, and/or data representing playback objects in simulations. The log data received in operation 602 may include data observed and/or perceived by a vehicle traversing an environment, such as data identifying characteristics of the environment and/or other agents/objects detected in proximity to the vehicle.

At operation 604, the simulation analysis component 538 may select a playback agent(s) within the driving log data, and determine an object type of the playback agent(s). In some examples, for each agent or object detected in the environment, the vehicle capturing the driving log data may detect and/or determine the agent's classification, size, shape, position, location, trajectory, velocity, acceleration, jerk, and the like, at periodic time intervals (e.g., every 0.1 second, every 0.05 seconds, every second, etc.) during the driving scenario. At operation 604, the simulation analysis component 538 may extract from the driving log data the object type associated with a playback agent. The object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.).

At operation 606, the simulation analysis component 538 may extract a set of observable behaviors associated with the playback agent(s), from the driving log data. For example, the playback agent analyzer 542 may determine, based on the driving log data 544, an object location, trajectory, direction of travel, speed, acceleration, jerk, or the like for one or more playback objects at various times within the driving log data. As noted above, the driving log data also may include locations, positions, and/or orientations of the various agent in the environment, and/or events observed by the vehicle such as accidents or near accidents, traffic violations, crossing or jaywalking pedestrians, cyclists, or animals, weather anomalies, construction zones, detours, school zones, and the like. The observable behaviors extracted from the driving log data in operation 606 also may be designated from a list of events and/or agent behaviors that are useful for driving simulations.

At operation 608, the simulation analysis component 538 may determine whether or not a sufficient amount of observable behaviors (e.g., a number of observations for a particular behavior characteristics meets or exceeds or a threshold value) has been determined for the playback agent(s) to determine reliable behavior characteristics based on the observable behaviors. In some cases, the simulation analysis component 538 may use only the driving log data for playback agents within a predetermined distance threshold of the vehicle that captured the driving log data, to improve the accuracy and reliability of the observations. Additionally or alternatively, the simulation analysis component 538 may include certain the observed behaviors for playback agents based on observing the playback agents for a sufficient amount of time within the driving log data, and may exclude other playback agents that have not been observed for a sufficient amount of time.

When a sufficient amount of observable behaviors has not been determined from the driving log data (608:No), process 600 may return to operation 602 to collect and aggregate additional driving log data to determine behavior characteristics. In some examples, if a sufficient amount of observable behaviors is not available for a single playback agent in a single driving scenario, in some cases the simulation analysis component 538 may aggregate the observable behaviors of multiple playback agents in the same driving scenario or in different driving scenarios. For instance, groups of playback agents may be determined based on object type (e.g., class and/or sub-class), the type or location of the driving scenario, the driving conditions, and/or other attributes of the driving logs, to provide a statistically sufficient amount of data to generate a histogram, distribution, or function representing a behavior characteristic.

When a sufficient amount of observable behaviors has been determined from the driving log data (608:Yes), at operation 610 the simulation analysis component 538 may determine one or more behavior characteristics associated with the playback agent(s) based on the observable behaviors from the driving log data. In some examples, the playback agent analyzer 542 may determine various behavior characteristics based on multiple measurements of observable agent behaviors (e.g., locations, velocities, trajectories, accelerations, jerks, etc.). Additionally or alternatively, the playback agent analyzer 542 may determine behavior characteristics based on with patterns of agent behavior derived or estimated based on combinations of different observable agent behaviors, such as driving styles and/or agent personality types.

At operation 612, the simulation analysis component 538 may aggregate the behavior characteristic(s) determined in operation 610 for groups of multiple playback agent(s), based on the object type and/or driving scenario location of the playback agent(s). For instance, as discussed above behaviors characteristics may be determined based on aggregations of driving log data associated with different object types and/or different locations (e.g., regions) and/or types of locations, based on log data captured from driving scenarios from different locations or types of locations. In some cases, different sets of behavior characteristics may be determined for different permutations of an object type, driving locations or location type, and/or set of driving condition, etc.

Figure 7:
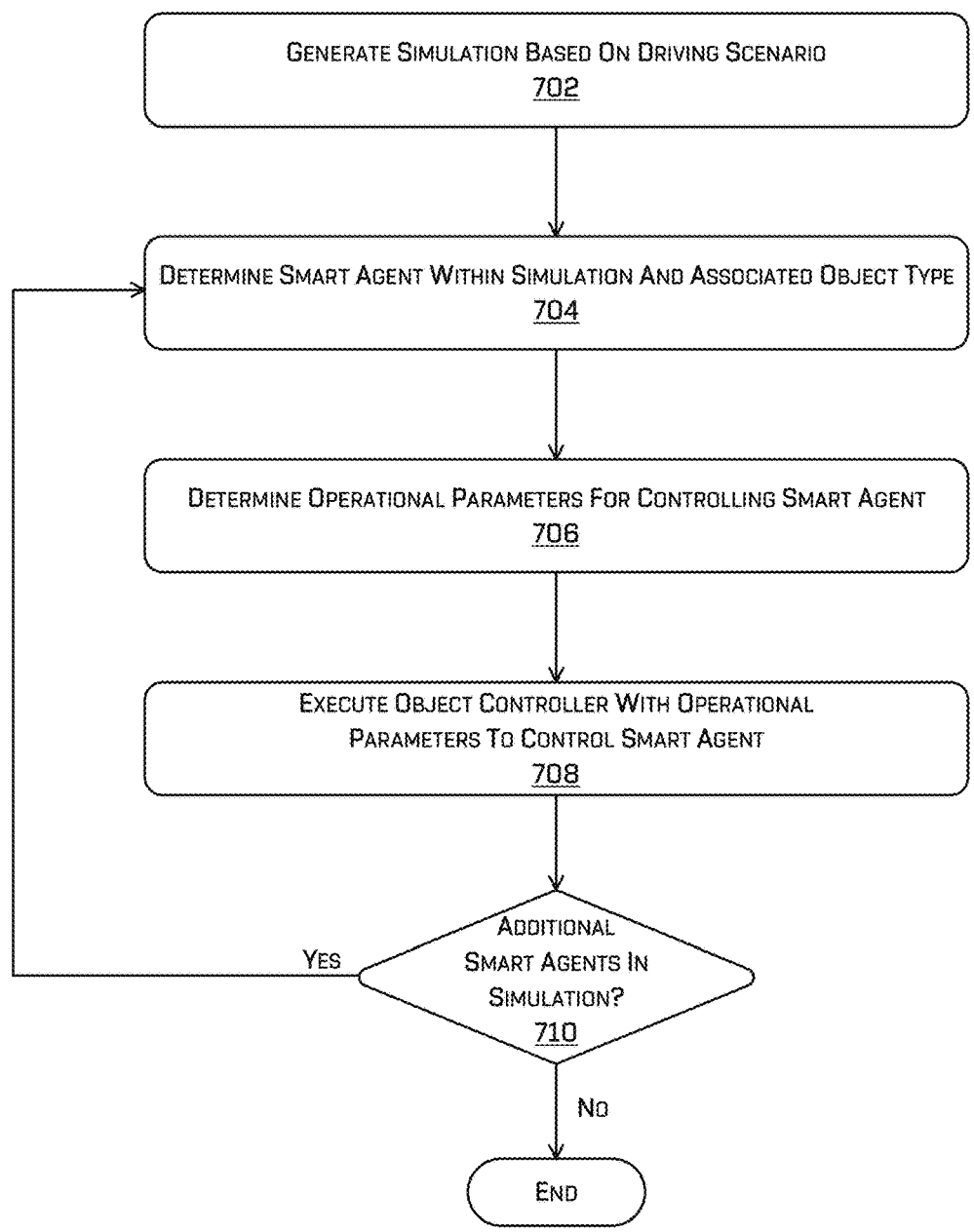
FIG. 7 is a flow diagram illustrating an example process for executing a driving simulation using a parameterized object controller to control the behavior of smart agents within the simulation, in accordance with one or more implementations of the disclosure.

FIG. 7 is a flow diagram illustrating an example process 700 for generating and executing a driving simulation, using one or more parameterized object controllers to control the behavior of smart agents within the simulation. In some examples, the operations of process 700 may be performed by the components of simulation system 532, such as the simulation execution component 540 alone or in conjunction with one or more object controller(s) 546 and/or sets of operational parameters 548.

At operation 702, the simulation system 532 may generate a simulation based on a driving scenario. As described above, to generate a driving simulation, the simulation execution component 540 may select a simulation scenario and execute a set of simulation instructions to generate the simulation data representative of the simulated environment simulated vehicle controlled based on autonomous vehicle controller, and one or more other simulated agents/objects in the simulated environment.

At operation 704, the simulation system 532 may determine a smart agent within the simulation, and an object type associated with the smart agent. In various examples, a simulation executed based on a simulation scenario may be populated with a number of simulated agents and other objects, which may include a combination of playback objects and smart agents (also referred to as smart objects). In some instances, the simulation system 532 may execute simulations based on a simulation scenario multiple times, using different combinations of playback objects/smart objects in the different simulations. Additionally, in some cases depending on the vehicle behaviors and interactions during the simulation, a playback object may be converted to a smart object during the course of a simulation.

At operation 706, the simulation system 532 may select an object controller 546 and/or a set of operational parameters 548 configured to control the smart agent, based at least in part on the object type. For examples, if a selected smart agent is a vehicle smart agent (or particular class of vehicle smart agent), the simulation system 532 may select an object controller 546 and a set of operational parameters 548. In this example, for vehicle smart agents of a different type, class, or subclass, the simulation system 532 may select the same object controller 546 and a different set of operational parameters 548. However, for a smart agent of a different object type (e.g., a pedestrian or bicycle smart agent), the simulation system 532 may select a different object controller 546. In some examples, the particular object controller 546 and/or particular set of operational parameters 548 selected by the simulation system 532 to control the smart agent in operation 706 also may be based on the characteristics of the simulation scenario, such as the location/region, type of scenario, and/or driving conditions.

At operation 708, the simulation system 532 may initiate the execution of the object controller 546, including configuring the object controller to use the operational parameters 548 to control the movements and behaviors of the smart agent during the simulation. As described above, during the simulation the object controller 546 associated with a smart agent may control the movement and behaviors of the smart agent, using the operational parameters 548, to guide the smart agent through the simulated environment. For instance, the object controller 546 and/or operational parameters 548 may determine the accelerations, velocities, trajectories, as well as decisions/behaviors (e.g., lane changes, speed adjustments, adjusting positions in a lane, following distances, when to yield, when to stop/re-route, etc.) for the smart agent at different times during the simulation. In some examples, the operational parameters 548 may include a velocity profile, an acceleration profile, and/or other movement profiles, and also may include profiles for determining trajectories, making driving/navigation decisions, perform route planning, and the like.

At operation 710, the simulation system 532 may determine if additional smart agents are to operate within the simulation. If the simulation includes one or more additional smart agents (710:Yes), then process 700 may return operation 702 to determine and initiate the object controllers and operational parameters for the additional smart agents. If the simulation does not include any additional smart agents (710:No), then process 700 may terminate and the simulation may be executed as described below in process 800.

Figure 8:
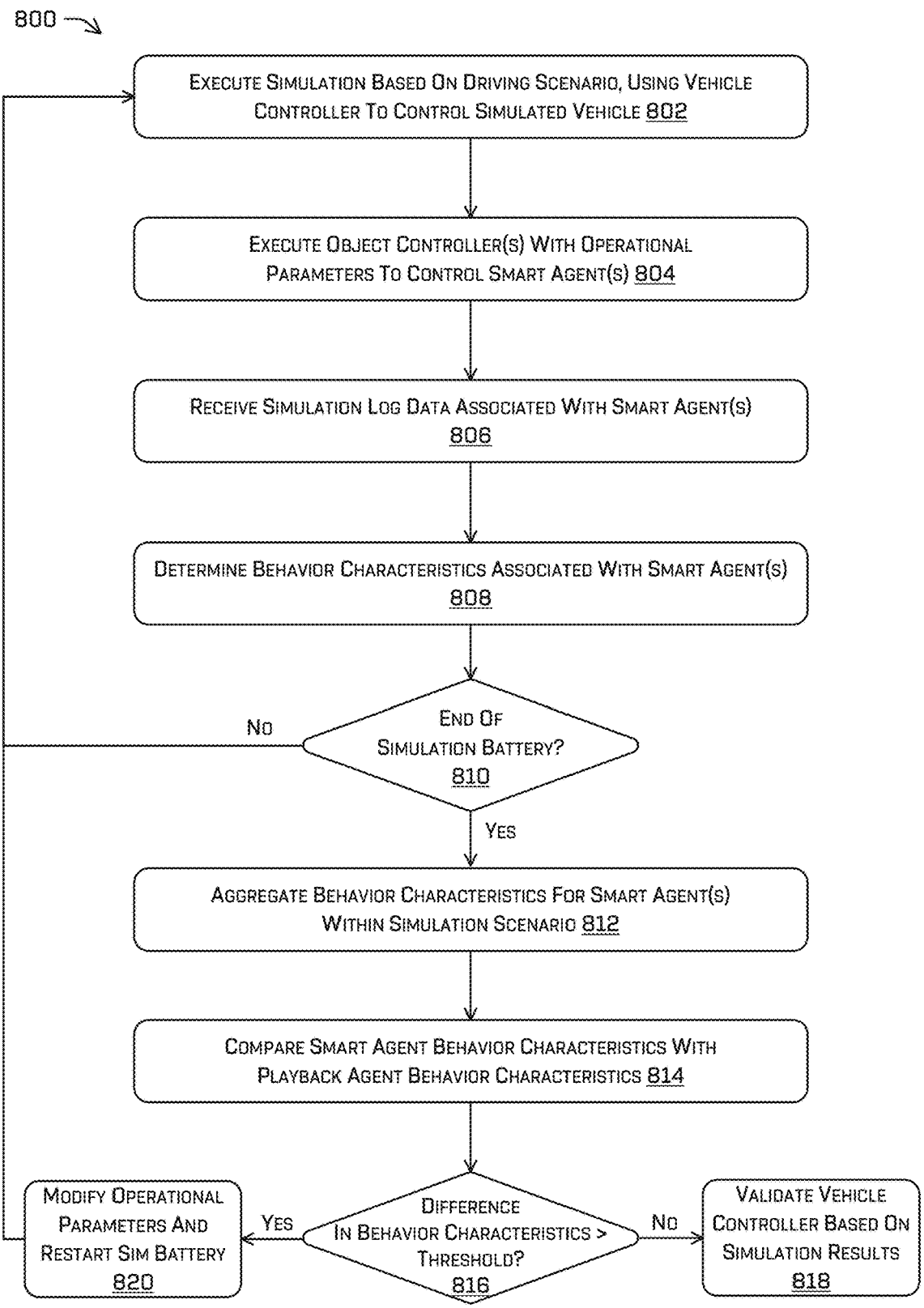
FIG. 8 is a flow diagram illustrating an example process for evaluating agent realism and simulation efficacy based on aggregated behavior characteristics within driving log data and a simulated driving scenario, in accordance with one or more implementations of the disclosure.

FIG. 8 is a flow diagram illustrating an example process 800 for performing one or more simulations, and evaluating agent realism and simulation efficacy, based on aggregated behavior characteristics within driving log data and a simulated driving scenario. In some examples, the operations of process 800 may be performed by the components of simulation system 532, such as the simulation execution component 540 alone or in conjunction with one or more object controller(s) 546 and/or operational parameters 548, and the simulation evaluator 550.

At operation 802, the simulation execution component 540 may execute a driving simulation based on simulation scenario. During the simulation, an autonomous vehicle controller may be used to control the simulated vehicle through the simulated environment. At operation 804, the simulation execution component 540 may execute one or more object controllers 546 to control one or more smart agents during the simulation. As described above in process 700, the simulation execution component 540 may determine an object controller 546 and a set of operational parameters 548 to control the movements and behaviors of the smart agent during the simulation. In some examples, the object controllers 546 may be selected based on the characteristics of the smart agent (e.g., object type) and/or attributes of the simulation scenario (e.g., location, time, scenario type, driving conditions, etc.).

At operation 806, the simulation execution component 540 may run the simulation, during which it may receive simulation log data associated with the smart agents controlled by the object controller 546, and at operation 808, the simulation execution component 540 may determine the behavior characteristics associated with the smart agents. To determine the behavior characteristics of the smart agents in operation 808, the simulation system 102 may use similar or identical techniques to those used to determine the behavior characteristics of non-simulated and/or playback agents, described above in process 600. In some examples, the simulation execution component 540 may receive simulation log data associated with the smart agent(s) during a single simulation, or after a battery of related simulations based on the same simulation scenario, or related simulation scenarios in which the same object controllers and/or operational parameters are used to control the smart agents. As shown in this example, operations 802-808 may be executed multiple times for a smart agent, or a group of related smart agents, over a battery of simulations based on the same or a similar simulation scenario. At operation 810, while the simulation battery continues (810:No), the simulation execution component 540 may execute additional simulations and determine additional behavior characteristics for the smart agents within the simulations.

At operation 812, at the end of a simulation battery (810:Yes), the simulation execution component 540 may aggregate the behavior characteristics of the smart agents determined in one or more iterations of operation 808. In some examples, the simulation system 540 may aggregate the observations from the simulation logs for each different smart agent, after running a battery of simulations, to determine a different set of behavior characteristics associated with each smart agent. In other examples, the simulation system 540 may aggregate the observations for multiple smart agents having the same object type, to determine different sets of behavior characteristics that represent each different object type of the smart agents (e.g., cars, trucks, bicycles, pedestrians, etc.). In either example, the observations of the decisions and/or movements of smart agents by the simulation system 540 may be collected based on a battery of multiple simulations based on a simulation scenario or multiple similar simulation scenario (e.g., different simulation scenarios having similar scenario types and locations, similar driving conditions, etc.).

At operation 814, the simulation execution component 540 may compare the aggregated smart agent behavior characteristics with the corresponding behavior characteristics determined for the playback agents in process 600. As discussed above, various techniques may be used to represent behavior characteristics of smart agents and/or of playback or non-simulated agents, based on aggregations of multiple observed behaviors. For instance, behavior characteristics of smart agents may be represented as averages, histograms, and/or distributions, which may be compared to other averages, histograms, and/or distributions representing the behavior characteristics of playback or non-simulated agents. At operation 816, the simulation execution component 540 may use the simulation evaluator 550 to evaluate the differences between the smart agent behavior characteristics and corresponding playback agent behavior characteristics. In some cases, the simulation evaluator 550 may compare histograms representing the behavior characteristics using the histograms comparison techniques described herein, and may compare the differences to a threshold.

In the illustrated example, when the differences between the behavior characteristics of the playback agents and corresponding behavior characteristics of the smart agents are less than a threshold difference value (816:No), then at operation 818 the simulation execution component 540 may validate the simulation results. As discussed above, the validation of the simulation results may indicate a relatively high degree of simulation efficacy, based on the determination in operation 816 that the simulated smart agents behave in a relatively realistic manner. Although operation 818 indicates validating the simulation results and performance of the autonomous vehicle controller, in some examples operation 818 may additionally or alternatively include validating the object controller(s) 546 and/or operational parameters 548 used to control the smart agents.

In other examples, when the differences between the behavior characteristics of the playback agents and corresponding behavior characteristics of the smart agents are greater than the threshold difference value (816:Yes), then the simulation execution component 540 may determine that the simulation results (and/or the object controllers or operational parameters used to control the smart agents) such cannot be validated. Instead, at operation 820, the simulation execution component 540 may either select a new object controller 546 and/or may modify the operational parameters 548 used by the object controller 546 to control the smart agents. After modifying the object controller and/or operational parameters 548 in operation 820, the simulation execution component 540 may re-execute one or more simulations or simulation batteries, and may re-evaluate the degree of smart agent realism provided by the new object controllers and/or modified operational parameters 548. As shown in this example, the simulation system 532 may implement an optimization algorithm in which object controller(s) 546 and/or operational parameters 548 may be modified repeatedly over multiple iterations of operation 820, until a sufficiently high (e.g., above a threshold) or optimal smart agent realism score is achieved.

EXAMPLE CLAUSES

A. A system comprising: one or more processors; and one or more computer-readable media storing computer-executable instructions that, when executed, cause the one or more processors to perform operations comprising: receiving first driving log data associated with an operation of a first object in a first physical environment, wherein the first object is associated with an object type; receiving second driving log data associated with an operation of a second object in a second physical environment, wherein the second object is associated with the object type; determining, based at least in part on the first driving log data and the second driving log data, a first value of a behavior characteristic associated with the object type; executing a driving simulation, wherein in the driving simulation includes a simulated vehicle controlled in a simulated environment by an autonomous vehicle controller, and a simulated object controlled by an object controller different from the autonomous vehicle controller, wherein the simulated object is associated with the object type; receiving simulation log data associated with an operation of the simulated object in the simulated environment; determining, based at least in part on the simulation log data, a second value of the behavior characteristic associated with the simulated object; determining an agent realism score for the driving simulation, based at least in part on the first value and the second value; determining a result of the driving simulation; and validating the autonomous vehicle controller based at least in part on the result of the driving simulation and on the agent realism score for the driving simulation.

B. The system of paragraph A, wherein determining the first value comprises determining, based at least in part on the first driving log data and the second driving log data, a first distribution associated with the behavior characteristic, wherein determining the first value comprises determining, based at least in part on the simulation log data, a second distribution associated with the behavior characteristic, and wherein determining the agent realism score for the driving simulation comprises comparing the first distribution and the second distribution.

C. The system of paragraph A, wherein: the object type is associated with a vehicle type having a driver; the behavior characteristic is associated with a driving personality type comprising at least one of an aggressive personality type, driving skill personality type, or a law-abidance personality type.

D. The system of paragraph A, the operations further comprising: modifying, as a modified parameter and based at least in part on determining that the agent realism score for the driving simulation is less than or equal to threshold value, a parameter used by the object controller; and executing a second driving simulation, wherein the second driving simulation includes the simulated object controlled by the object controller, based at least in part on the modified parameter.

E. The system of paragraph A, wherein determining the first value comprises: determining a location associated with the driving simulation; and using the first driving log data and the second driving log data as input data to determine the first value, based at least in part on determining that the location is associated with the first physical environment and the second physical environment.

F. A method comprising: receiving first data associated with an operation of an object in a physical environment; determining, based at least in part on the first data, a first value associated with a behavior characteristic; executing a driving simulation, wherein the driving simulation includes a simulated object controlled by an object controller within a simulated environment, and wherein the simulated object represents a different object from the object in the physical environment; receiving second data associated with an operation of the simulated object in the simulated environment; determining, based at least in part on the second data, a second value associated with the behavior characteristic; and determining a score for the driving simulation, based at least in part on the first value and the second value.

G. The method of paragraph F, wherein the first data is associated with a first driving scenario, and the driving simulation is a simulation of a second driving scenario different from the first driving scenario.

H. The method of paragraph F, further comprising: determining, based at least in part on the first value, a first distribution associated with the behavior characteristic; and determining, based at least in part on the second value, a second distribution associated with the behavior characteristic, wherein determining the score for the driving simulation comprises comparing the first distribution and the second distribution.

I. The method of paragraph F, wherein: the object is a vehicle; the simulated object is a simulated vehicle; the behavior characteristic is associated with a driving personality type comprising at least one of an aggressive personality type, driving skill personality type, or a law-abidance personality type.

J. The method of paragraph F, further comprising: modifying a parameter used by the object controller to control the simulated object, into a modified parameter, based at least in part on determining that the score for the driving simulation is less than threshold value; and executing a second driving simulation, wherein the second driving simulation includes the simulated object controlled by the object controller, based at least in part on the modified parameter.

K. The method of paragraph F, wherein determining the first value comprises: determining a location associated with the driving simulation; and using the first data as input data to determine the first value, based at least in part on determining that the location is associated with the physical environment.

L. The method of paragraph F, wherein the driving simulation includes a simulated vehicle different from the simulated object, and wherein the method further comprises: controlling the simulated vehicle during the driving simulation, using an autonomous vehicle controller different from the object controller; determining a result of the driving simulation; validating the autonomous vehicle controller based at least in part on the result of the driving simulation and on the score for the driving simulation; and transmitting the autonomous vehicle controller to an autonomous vehicle configured to operate in a physical environment, based at least in part on validating the autonomous vehicle controller.

M. The method of paragraph F, further comprising: determining a first histogram of behavior characteristic values associated with the operation of the object in the physical environment, based at least in part on the first data; determining a second histogram of behavior characteristic values associated with the operation of the simulated object in the simulated environment, based at least in part on the second data; executing a histogram comparison technique based at least in part on the first histogram and the second histogram, wherein the score for the driving simulation is based at least in part on an output of the histogram comparison technique.

N. One or more non transitory computer readable media storing instructions executable by a processor, wherein the instructions, when executed, cause the processor to perform operations comprising: receiving first data associated with an operation of an object in a physical environment; determining, based at least in part on the first data, a first value associated with a behavior characteristic; executing a driving simulation, wherein the driving simulation includes a simulated object controlled by an object controller within a simulated environment, and wherein the simulated object represents a different object from the object in the physical environment; receiving second data associated with an operation of the simulated object in the simulated environment; determining, based at least in part on the second data, a second value associated with the behavior characteristic; and determining a score for the driving simulation, based at least in part on the first value and the second value.

O. The one or more non transitory computer readable media of paragraph N, wherein the first data is associated with a first driving scenario, and the driving simulation is a simulation of a second driving scenario different from the first driving scenario.

P. The one or more non transitory computer readable media of paragraph N, the operations further comprising: determining, based at least in part on the first value, a first distribution associated with the behavior characteristic; and determining, based at least in part on the second value, a second distribution associated with the behavior characteristic, wherein determining the score for the driving simulation comprises comparing the first distribution and the second distribution.

Q. The one or more non transitory computer readable media of paragraph N, wherein: the object is a vehicle; the simulated object is a simulated vehicle; the behavior characteristic is associated with a driving personality type comprising at least one of an aggressive personality type, driving skill personality type, or a law-abidance personality type.

R. The one or more non transitory computer readable media of paragraph N, the operations further comprising: modifying a parameter used by the object controller to control the simulated object, into a modified parameter, based at least in part on determining that the score for the driving simulation is less than threshold value; and executing a second driving simulation, wherein the second driving simulation includes the simulated object controlled by the object controller, based at least in part on the modified parameter.

S. The one or more non transitory computer readable media of paragraph N, wherein determining the first value comprises: determining a location associated with the driving simulation; and using the first data as input data to determine the first value, based at least in part on determining that the location is associated with the physical environment.

T. The one or more non transitory computer readable media of paragraph N, wherein the driving simulation includes a simulated vehicle different from the simulated object, and wherein the operations further comprise: controlling the simulated vehicle during the driving simulation, using an autonomous vehicle controller different from the object controller; determining a result of the driving simulation; validating the autonomous vehicle controller based at least in part on the result of the driving simulation and on the score for the driving simulation; and transmitting the autonomous vehicle controller to an autonomous vehicle configured to operate in a physical environment, based at least in part on validating the autonomous vehicle controller.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed, cause the one or more processors to perform operations comprising:
receiving driving log data associated with an operation of a vehicle in a physical environment, the driving log data including sensor data representing an agent in the physical environment;
determining, based at least in part on the driving log data, a first plurality of observations associated with the agent over a first period of time, wherein the first plurality of observations correspond to observations of a first movement metric of the agent at different times in the physical environment;
determining, based at least in part on the first plurality of observations, a first aggregation of the first movement metric for the agent;
executing a driving simulation, wherein the driving simulation includes a simulated vehicle associated with the vehicle in the physical environment and controlled in a simulated environment by an autonomous vehicle controller, and a simulated agent different from the simulated vehicle and controlled by an agent controller different from the autonomous vehicle controller;
determining, based at least in part on the driving simulation, a second plurality of observations associated with the simulated agent over a second period of time, wherein the second plurality of observations correspond to observations of the first movement metric of the simulated agent at different times in the simulated environment;
determining, based at least in part on the second plurality of observations, a second aggregation of the first movement metric for the simulated agent;
determining an agent realism score associated with the simulated agent in the driving simulation, based at least in part on comparing the first aggregation of the first movement metric and the second aggregation of the first movement metric;
determining a result of the driving simulation; and
validating the autonomous vehicle controller based at least in part on the result of the driving simulation and on the agent realism score.

2. The system of claim 1,
wherein determining the first aggregation comprises determining, based at least in part on the driving log data, a first distribution of the first movement metric for the agent,
wherein determining the second aggregation comprises determining, based at least in part on the driving simulation, a second distribution of the first movement metric for simulated agent, and
wherein determining the agent realism score associated with the simulated agent comprises comparing the first distribution of the first movement metric and the second distribution of the first movement metric.

3. The system of claim 1, the operations further comprising:
modifying, as a modified parameter and based at least in part on determining that the agent realism score for the driving simulation is less than or equal to a threshold value, a parameter used by the agent controller; and
executing a second driving simulation, wherein executing the second driving simulation includes controlling the simulated agent by the agent controller, based at least in part on the modified parameter.

4. The system of claim 1, wherein determining the first aggregation of the first movement metric for the agent comprises:
determining a location associated with the driving simulation; and
using the driving log data as input data to determine the first aggregation, based at least in part on determining that the location is associated with the physical environment.

5. A method comprising:
receiving log data associated with an operation of a vehicle in a physical environment, the log data including sensor data representing an agent in the physical environment;
determining, based at least in part on the log data, a first plurality of observations associated with the agent over a first period of time, wherein the first plurality of observations correspond to observations of a first movement metric of the agent at different times in the physical environment;
determining, based at least in part on the first plurality of observations, a first aggregation of the first movement metric for the agent;
executing a driving simulation, wherein the driving simulation includes a simulated vehicle associated with the vehicle in the physical environment and a simulated agent different from the simulated vehicle, wherein the simulated agent is controlled by an agent controller within a simulated environment;
determining, based at least in part on the driving simulation, a second plurality of observations associated with the simulated agent over a second period of time, wherein the second plurality of observations correspond to observations of the first movement metric of the simulated agent at different times in the simulated environment;
determining, based at least in part on the second plurality of observations, a second aggregation of the first movement metric for the simulated agent; and
determining an agent realism score associated with the simulated agent in the driving simulation, based at least in part on comparing the first aggregation of the first movement metric and the second aggregation of the first movement metric.

6. The method of claim 5, wherein the log data is associated with a first driving scenario, and the driving simulation is a simulation of a second driving scenario different from the first driving scenario.

7. The method of claim 5, wherein:
determining the first aggregation comprises determining, based at least in part on the log data, a first distribution of the first movement metric for the agent;
determining the second aggregation comprises determining, based at least in part on the driving simulation, a second distribution of the first movement metric for the simulated agent; and
determining the agent realism score associated with the simulated agent comprises comparing the first distribution of the first movement metric and the second distribution of the first movement metric.

8. The method of claim 5, further comprising:
modifying a parameter used by the agent controller to control the simulated agent, into a modified parameter, based at least in part on determining that the agent realism score is less than a threshold value; and
executing a second driving simulation, wherein executing the second driving simulation includes controlling the simulated agent by the agent controller, based at least in part on the modified parameter.

9. The method of claim 5, wherein determining the first aggregation of the first movement metric for the agent comprises:
determining a location associated with the driving simulation; and
using the log data as input data to determine the first aggregation, based at least in part on determining that the location is associated with the physical environment.

10. The method of claim 5, further comprising:
controlling the simulated vehicle during the driving simulation, using an autonomous vehicle controller different from the agent controller;
determining a result of the driving simulation;
validating the autonomous vehicle controller based at least in part on the result of the driving simulation and on the agent realism score; and
transmitting the autonomous vehicle controller to an autonomous vehicle configured to control the autonomous vehicle, based at least in part on validating the autonomous vehicle controller.

11. The method of claim 5, wherein:
determining the first aggregation comprises determining a first histogram of the first movement metric for the agent in the physical environment, based at least in part on the log data;
determining the second aggregation comprises determining a second histogram of the first movement metric for the simulated agent in the simulated environment, based at least in part on the driving simulation; and
determining the agent realism score associated with the simulated agent comprises executing a histogram comparison technique based at least in part on the first histogram and the second histogram.

12. The method of claim 5, wherein the first movement metric comprises at least one of:
velocity;
acceleration;
following distance;
jerkiness; or
adherence to driving rules.

13. The method of claim 5, wherein determining the first aggregation comprises:
determining, in the log data, the sensor data representing the agent in the physical environment;
determining, in the log data, additional sensor data representing an additional agent in the physical environment; and
determining, based at least in part on the sensor data and the additional sensor data, a combined aggregation of the first movement metric for the agent and the additional agent in the physical environment.

14. One or more non-transitory computer-readable media storing instructions executable by a processor, wherein the instructions, when executed, cause the processor to perform operations comprising:
receiving log data associated with an operation of a vehicle in a physical environment, the log data including sensor data representing an agent in the physical environment;
determining, based at least in part on the log data, a first plurality of observations associated with the agent over a first period of time, wherein the first plurality of observations correspond to observations of a first movement metric of the agent at different times in the physical environment;
determining, based at least in part on the first plurality of observations, a first aggregation of the first movement metric for the agent;
executing a driving simulation, wherein the driving simulation includes a simulated vehicle associated with the vehicle in the physical environment and a simulated agent different from the simulated vehicle, wherein the simulated agent is controlled by an agent controller within a simulated environment;
determining, based at least in part on the driving simulation, a second plurality of observations associated with the simulated agent over a second period of time, wherein the second plurality of observations correspond to observations of the first movement metric of the simulated agent at different times in the simulated environment;
determining, based at least in part on the second plurality of observations, a second aggregation of the first movement metric for the simulated agent; and
determining an agent realism score associated with the simulated agent in the driving simulation, based at least in part on comparing the first aggregation of the first movement metric and the second aggregation of the first movement metric.

15. The one or more non-transitory computer-readable media of claim 14, wherein the log data is associated with a first driving scenario, and the driving simulation is a simulation of a second driving scenario different from the first driving scenario.

16. The one or more non-transitory computer-readable media of claim 14, wherein:
determining the first aggregation comprises determining, based at least in part on the log data, a first distribution of the first movement metric for the agent;
determining the second aggregation comprises determining, based at least in part on the driving simulation, a second distribution of the first movement metric for the simulated agent; and
determining the agent realism score associated with the simulated agent comprises comparing the first distribution of the first movement metric and the second distribution of the first movement metric.

17. The one or more non-transitory computer-readable media of claim 14, the operations further comprising:
modifying a parameter used by the agent controller to control the simulated agent, into a modified parameter, based at least in part on determining that the agent realism score is less than a threshold value; and
executing a second driving simulation, wherein executing the second driving simulation includes controlling the simulated agent by the agent controller, based at least in part on the modified parameter.

18. The one or more non-transitory computer-readable media of claim 14, wherein determining the first aggregation of the first movement metric for the agent comprises:
determining a location associated with the driving simulation; and
using the log data as input data to determine the first aggregation, based at least in part on determining that the location is associated with the physical environment.

19. The one or more non-transitory computer-readable media of claim 14, wherein the operations further comprise:
controlling the simulated vehicle during the driving simulation, using an autonomous vehicle controller different from the agent controller;
determining a result of the driving simulation;
validating the autonomous vehicle controller based at least in part on the result of the driving simulation and on the agent realism score; and
transmitting the autonomous vehicle controller to an autonomous vehicle configured to control the autonomous vehicle, based at least in part on validating the autonomous vehicle controller.

* * * * *